United States Patent
Ko et al.

(10) Patent No.: US 11,853,108 B2
(45) Date of Patent: Dec. 26, 2023

(54) ELECTRONIC APPARATUS FOR SEARCHING RELATED IMAGE AND CONTROL METHOD THEREFOR

(71) Applicant: SAMSUNG ELECTRONICS CO., LTD., Suwon-si (KR)

(72) Inventors: Hyeon Mok Ko, Suwon-si (KR); Hyung Rai Oh, Suwon-si (KR); Hong Chul Kim, Suwon-si (KR); Silas Jeon, Suwon-si (KR); In-Chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 462 days.

(21) Appl. No.: 16/757,826

(22) PCT Filed: Oct. 24, 2018

(86) PCT No.: PCT/KR2018/012640
§ 371 (c)(1),
(2) Date: Apr. 21, 2020

(87) PCT Pub. No.: WO2019/083275
PCT Pub. Date: May 2, 2019

(65) Prior Publication Data
US 2021/0191971 A1 Jun. 24, 2021

(30) Foreign Application Priority Data
Oct. 27, 2017 (KR) .................. 10-2017-0140805

(51) Int. Cl.
*G06K 9/00* (2022.01)
*G06F 16/583* (2019.01)
(Continued)

(52) U.S. Cl.
CPC .......... *G06F 16/583* (2019.01); *G06F 16/532* (2019.01); *G06F 16/535* (2019.01);
(Continued)

(58) Field of Classification Search
CPC .. G06F 16/5854; G06F 16/532; G06F 16/535; G06F 16/5866; G06F 16/583;
(Continued)

(56) References Cited

U.S. PATENT DOCUMENTS

| | | | |
|---|---|---|---|
| 9,135,277 B2 | 9/2015 | Petrou | |
| 9,195,898 B2 | 11/2015 | Huang et al. | |

(Continued)

FOREIGN PATENT DOCUMENTS

| | | |
|---|---|---|
| CN | 101553831 | 10/2009 |
| CN | 103336769 | 10/2013 |

(Continued)

OTHER PUBLICATIONS

Communication pursuant to Article 94(3) EPC dated Aug. 19, 2021 in counterpart European Patent Application No. 18869828.6.
(Continued)

*Primary Examiner* — Jonathan S Lee
(74) *Attorney, Agent, or Firm* — Nixon & Vanderhye, P.C.

(57) ABSTRACT

The disclosure relates to an artificial intelligence (AI) system using a machine learning algorithm such as deep learning and the like, and an application thereof. In particular, there is provided a control method for an electronic apparatus for searching for an image, the method comprising displaying an image comprising at least one object, detecting a user input for selecting an object, recognizing an object displayed at a point at which the user input is detected and acquiring information regarding the recognized object by using a recognition model trained to acquire information
(Continued)

regarding an object, displaying a list including the information regarding the object, and based on one piece of information being selected from the information regarding the object included in the list, providing a related image by searching for the related image based on the selected information.

13 Claims, 22 Drawing Sheets

(51) Int. Cl.
  *G06N 20/00* (2019.01)
  *G06F 16/535* (2019.01)
  *G06F 16/58* (2019.01)
  *G06F 16/532* (2019.01)
  *G06F 18/214* (2023.01)

(52) U.S. Cl.
  CPC ...... *G06F 16/5854* (2019.01); *G06F 16/5866* (2019.01); *G06F 18/214* (2023.01); *G06N 20/00* (2019.01)

(58) Field of Classification Search
  CPC . G06F 3/04842; G06F 3/0488; G06K 9/6256; G06N 20/00; G06N 3/08; G06N 99/00
  USPC ......................................................... 382/305
  See application file for complete search history.

(56) References Cited

U.S. PATENT DOCUMENTS

| | | | |
|---|---|---|---|
| 9,426,568 | B2 | 8/2016 | Lakkundi et al. |
| 9,489,401 | B1 | 11/2016 | Garcia et al. |
| 9,563,818 | B2 | 2/2017 | Hwang et al. |
| 9,600,499 | B2 | 3/2017 | Kutaragi et al. |
| 9,665,894 | B2 | 5/2017 | Kumazawa et al. |
| 9,778,825 | B2 | 10/2017 | Cho et al. |
| 10,191,616 | B2 | 1/2019 | Choi et al. |
| 10,515,110 | B2 | 12/2019 | Jing et al. |
| 10,534,808 | B2 | 1/2020 | Petrou |
| 10,614,120 | B2 | 4/2020 | Jin et al. |
| 11,314,804 | B2 | 4/2022 | Jin et al. |
| 2008/0071770 | A1 | 3/2008 | Schloter et al. |
| 2010/0260426 | A1* | 10/2010 | Huang .................. G06V 10/10 707/E17.031 |
| 2011/0125735 | A1 | 5/2011 | Petrou |
| 2013/0330008 | A1 | 12/2013 | Zadeh |
| 2014/0003714 | A1* | 1/2014 | Mei ...................... G06F 16/532 345/173 |
| 2014/0149376 | A1 | 5/2014 | Kutaragi et al. |
| 2014/0164406 | A1 | 6/2014 | Petrou |
| 2014/0172831 | A1 | 6/2014 | Jin et al. |
| 2015/0084883 | A1 | 3/2015 | Kim et al. |
| 2015/0193104 | A1 | 7/2015 | Cho et al. |
| 2016/0224591 | A1 | 8/2016 | Kim et al. |
| 2017/0032047 | A1 | 2/2017 | Raina et al. |
| 2019/0012334 | A1 | 1/2019 | Petrou |
| 2020/0201901 | A1 | 6/2020 | Jin et al. |

FOREIGN PATENT DOCUMENTS

| | | |
|---|---|---|
| CN | 102625937 | 2/2014 |
| CN | 103870535 | 6/2014 |
| CN | 104767871 | 7/2015 |
| CN | 106570015 | 4/2017 |
| EP | 2 843 510 | 3/2015 |
| EP | 2 996 023 | 3/2016 |
| JP | 2017-504861 | 2/2017 |
| KR | 10-0930249 | 12/2009 |
| KR | 10-2014-0019630 | 2/2014 |
| KR | 10-2014-0064326 | 5/2014 |
| KR | 10-2014-0077510 | 6/2014 |
| KR | 10-2015-0033202 | 4/2015 |
| KR | 10-1698096 | 1/2017 |
| KR | 10-1730367 | 4/2017 |
| KR | 10-1768521 | 8/2017 |
| WO | 2012/176317 | 12/2012 |
| WO | 2014/092451 | 6/2014 |

OTHER PUBLICATIONS

Extended Search Report dated Apr. 29, 2020 in counterpart European Patent Application No. 18869828.6.
International Search Report (with English translation) for PCT/KR2018/012640 dated Feb. 7, 2019, 5 pages.
Written Opinion of the ISA (with English translation) for PCT/KR2018/012640, dated Feb. 7, 2019, 12 pages.
Office Action dated Mar. 9, 2023 in Chinese Patent Application No. 201880067738.6 and English-language translation.
Office Action dated Mar. 27, 2023 in Korean Patent Application No. 10-2017-0140805 and English-language translation.
Result of consultation dated Apr. 19, 2023 in European Patent Application No. 18869828.6.
Summons to attend oral proceedings dated Aug. 31, 2022 in European Patent Application No. 18869828.6.
Office Action dated Sep. 16, 2022 in Korean Patent Application No. 10-2017-0140805 and English-language translation.
Office Action dated Aug. 21, 2023 in Chinese Patent Application No. 201880067738.6 and English-language translation.

* cited by examiner

FIG. 9A
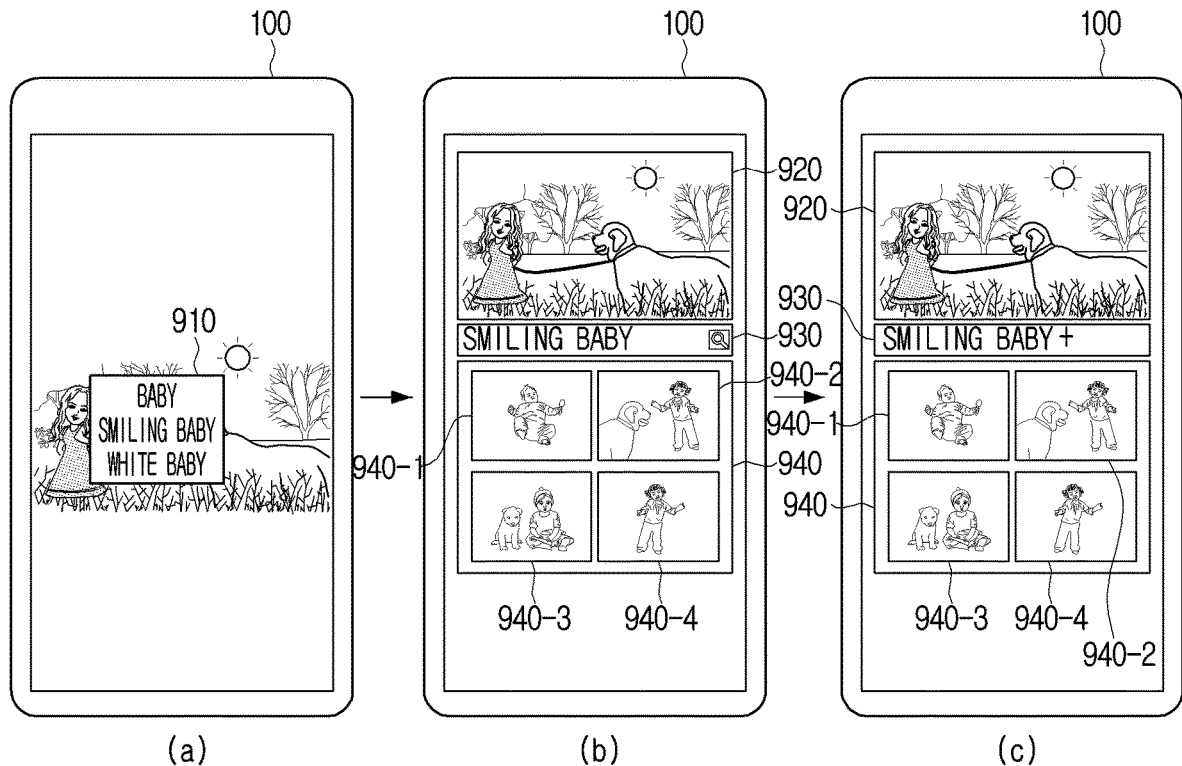
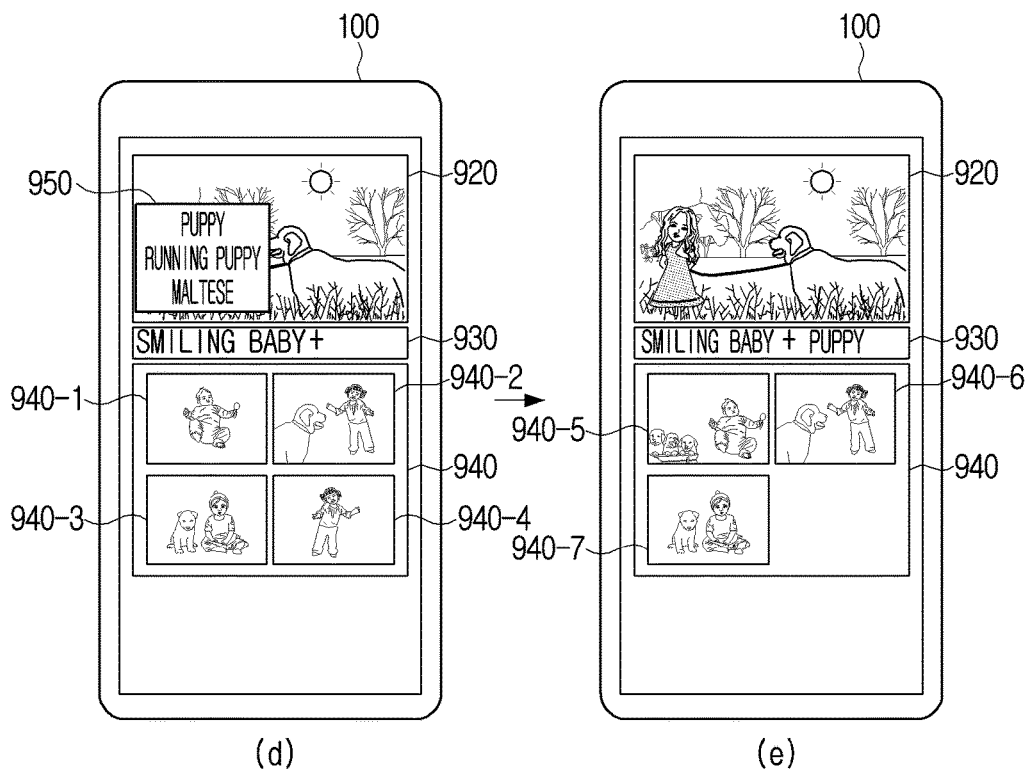

ELECTRONIC APPARATUS FOR SEARCHING RELATED IMAGE AND CONTROL METHOD THEREFOR

This application is the U.S. national phase of International Application No. PCT/KR2018/012640 filed 24 Oct. 2018, which designated the U.S. and claims priority to KR Patent Application No. 10-2017-0140805 filed 27 Oct. 2017, the entire contents of each of which are hereby incorporated by reference.

BACKGROUND

The disclosure relates to an electronic apparatus and a control method therefor, more particularly relates to an electronic apparatus for searching for an image related to an object selected by a user and providing the related image to the user, and a control method therefor.

In addition, the disclosure relates to an artificial intelligence (AI) system simulating functions such as recognition, determination, and the like of the human brain using a machine learning algorithm, and an application thereof.

DESCRIPTION OF RELATED ART

A user can easily receive necessary information through electronic apparatuses without any limit to place and time along with development of communication technologies and user interfaces of the electronic apparatuses.

When an electronic apparatus provides a screen including an object, a user may wish to search for related information relating to the provided object.

For this, a user may separately store an object and execute image searching using the stored object as a keyword or text searching by directly inputting text related to the object.

In addition, an artificial intelligence system realizing a human level of intelligence is recently used in various fields. Unlike the rule-based system, the artificial intelligence system is a system in that a machine trains, determines, and becomes smart, itself. As the artificial intelligence system is used, a recognition rate is improved and preferences of a user can be more accurately understood, and thus, the existing rule-based system is gradually being replaced with the deep learning-based artificial intelligence system.

The artificial intelligence technology includes machine learning (e.g., deep learning) and element technology using the machine learning.

The machine learning is an algorithm technology of self-classifying/self-training features of input data, and the element technology is a technology simulating functions of the human brain such as recognition or determination using the machine learning algorithm such as the deep learning and is composed of technical fields of language understanding, visual understanding, inference/prediction, knowledge representation, operation control, and the like.

Various fields, to which the artificial intelligence technology is applied, are as follows. The language understanding is a technology of recognizing languages/alphabets of human and applying/processing it and includes natural language processing, machine translation, a conversion system, question and answer, voice recognition/synthesis, and the like. The visual understanding is a technology of recognizing an object in a view of human and processing it and includes object recognition, object tracking, image searching, human recognition, scene understanding, space understanding, image improvement, and the like. The inference/prediction is a technology of identifying the information and logically inferring and predicting it and includes knowledge/possibility-based inference, optimization prediction, preference-based planning, recommendation, and the like. The knowledge representation is a technology of performing automating processing of experiment information of human into knowledge data and includes knowledge construction (data generation/classification), knowledge management (data application), and the like. The operation control is a technology of controlling automatic driving of a vehicle or movement of a robot and includes movement control (navigation, collision, or travelling), manipulation control (behavior control), and the like.

Meanwhile, the recent electronic apparatus provides a function of searching for a picture stored in the apparatus. A user searched for a picture using references such as a date when the picture has taken, a title that the user has input, or a location where the picture has taken.

However, such a searching method has a limit to searching for a picture having a feature related to the picture that the user is currently looking at.

SUMMARY

The disclosure may provide an electronic apparatus for confirming information related to an object selected by a user and searching for an image related to the information selected by the user from the confirmed information, and a control method therefor.

According to an embodiment of the disclosure, there is provided a control method of an electronic apparatus including: displaying an image comprising at least one object; detecting a user input for selecting an object; recognizing an object displayed at a point at which the user input is detected and acquiring information regarding the recognized object by using a recognition model trained to acquire information regarding an object; displaying a list including the information regarding the object; and based on one piece of information being selected from the information regarding the object included in the list, searching for and providing a related image based on the selected information.

According to another embodiment of the disclosure, there is provided an electronic apparatus including: a display; a user input unit; a processor electrically connected to the display and the user input unit; and a memory electrically connected to the processor, in which the processor is configured to acquire an input signal according to a user input for selecting an object by using the user input unit, while an image comprising at least one object is displayed on the display, recognize an object displayed at a point at which the user input is detected and acquire information regarding the recognized object by using a recognition model trained to acquire information regarding an object in response to the input signal, control the display to display a list including the information regarding the object, and based on one piece of information being selected from the information regarding the object included in the list via the user input unit, search for and provide a related image based on the selected information.

According to the embodiments described above, a user may search for an image similar to an image that the user is currently looking at, more conveniently and specifically.

In addition, a user may perform more accurate image searching, by searching for an image by creating a search formula based on information of various objects.

Therefore, the diversity and the accuracy may increase in the searching of an image desired by a user, thereby improving satisfaction and convenience of a user.

BRIEF DESCRIPTION OF THE DRAWINGS

FIGS. 9A and 9B are diagrams for explaining a method for searching for a related image by using a search formula according to an embodiment.

DETAILED DESCRIPTION

Figure 1:
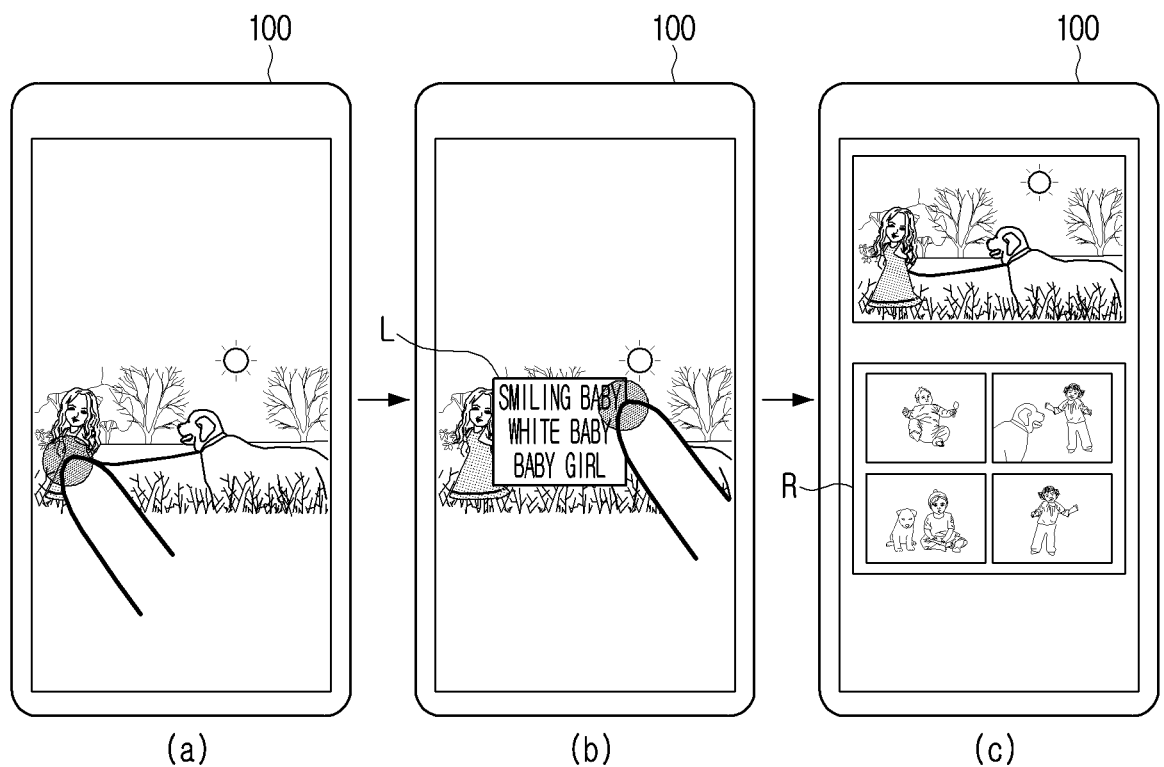
FIG. 1 is a view showing a use of an electronic apparatus for searching for an image related to an object selected by a user according to an embodiment.

Hereinafter, various embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", or "consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured (or set) to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

An electronic apparatus according to various embodiments of the disclosure may include at least one of, for example, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device. According to various embodiments, a wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implant type (implantable circuit). In addition, in some embodiments, the electronic apparatus may include at least one of, for example, a television, a digital video disk (DVD) player, an audio system, a refrigerator, air-conditioner, a vacuum cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

In other embodiments, the electronic apparatus may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), or computed tomography (CT) scanner, or ultrasonic wave device, etc., a navigation system, a global navigation satellite system (GNSS), an event data recorder (EDR), a flight data recorder (FDR), an automotive infotainment device, a marine electronic equipment (e.g., marine navigation devices, gyro compasses, etc.), avionics, a security device, a car head unit, industrial or domestic robots, a drone, an ATM of financial institution, a point of sale of (POS) a store, or an Internet of Things (IoT) device (e.g., light bulbs, sensors, sprinkler devices, fire alarms, thermostats, street lights, toasters, exercise equipment, hot water tanks, heater, boiler, etc.).

In this disclosure, a term "user" may refer to a person using an electronic apparatus or an apparatus (e.g., an artificial intelligence electronic apparatus) using an electronic apparatus.

First, as shown in (a) of FIG. 1, an electronic apparatus 100 may display an image (e.g., a picture) including an object O (e.g., a baby). The selected object O may be one of a plurality of objects included in the image.

In order to search for an image related to the object O, the electronic apparatus 100 may detect a user input for selecting the object O as shown in (a) of FIG. 1. For an example, the electronic apparatus 100 may detect a long press touch that is to tap and hold a point of the object O down for a predetermined period of time. Alternatively, the electronic apparatus 100 may detect a user input that is multi-touch of the object O, force touch, drawing on a periphery of the object O, or dragging diagonally to pass at least a part of the object O, using fingers or an electronic pen. Alternatively, the electronic apparatus 100 may detect a user input that is to tap the object O, after pressing (or while pressing) a button (for example, a button for executing an artificial intelligence function) prepared on the electronic apparatus 100. Alternatively, the electronic apparatus 100 may detect a user input for selecting the object O using an action defined in a dictionary.

Next, the electronic apparatus 100 may identify (detect) an object region in which the object O is displayed through image analysis based on information regarding the point at which the user input is detected. The identified object region may be displayed as a highlighted part or displayed as a pop-up screen. For an example, the displaying as a highlighted part may include displaying with different shadows, different brightness, or complementary colors, displaying by separating a boundary of the object region with a dotted line or a solid line, or displaying an indicator indicating the object region.

Next, the electronic apparatus 100 may recognize the object O included in the object region. The electronic apparatus 100 may recognize the object O in the object region using a recognition model (for example, object recognition model) trained to recognize objects. The electronic apparatus 100 may recognize a type, a color, a size, and the like of the object O.

In addition, the electronic apparatus 100 may recognize context information regarding the recognized object O. The electronic apparatus 100 may acquire the context information of the object O using a recognition model (for example, context recognition model) trained to recognize contexts of the objects. With the context information of the object O, an emotion, face expression, a location, a movement, clothes, and the like of the object O may be recognized. The context information of the object O may be acquired through analysis regarding the object O itself, and may be acquired using a different object displayed in the vicinity of the object O in the image.

When the electronic apparatus 100 acquires information regarding the object (that is, including both of the recognition information of the object and the context information of the object), the electronic apparatus 100 may display a list L including the acquired information regarding the object as shown in (b) of FIG. 1. The list L may be displayed in the vicinity of the object O selected by a user, but this is merely an embodiment, and the list L may be displayed in a separate region.

In addition, the electronic apparatus 100 may generate a layer of other images including the list L, and may move the list L in the image according to the user input. That is, the electronic apparatus 100 may generate a graphic layer including the list L in addition to a graphic layer including the originally displayed image, and display the two graphic layers by laminating those.

Next, the electronic apparatus 100 may detect the user input for selecting one piece of information from the information regarding the object included in the list L. The user input may be a user input that is to touch one piece of information from the information regarding the object included in the list.

When a user touch is detected, the electronic apparatus 100 may search for an image related to the selected information regarding the object and provide a searched result R in a specific region as shown in (c) of FIG. 1. As shown in (c) of FIG. 1, the electronic apparatus 100 may provide the searched result R by reducing a size of the originally displayed image and generating a new region, but this is merely an embodiment, and the searched result R may be provided in other methods. For example, the electronic apparatus 100 may generate a separate pop-up window on the originally displayed image and provide the searched result in the pop-up window. The searched result R may be provided as a thumbnail image.

In particular, in a case of searching for an image related to the information regarding the object selected among images stored in the electronic apparatus 100, the electronic apparatus 100 may search for an image related to the selected information regarding the object based on tag information of the stored images and the selected information of the object. Alternatively, in a case of searching for an image related to the selected information regarding the object from an external server, the electronic apparatus 100 may transmit a query including the selected information regarding the object to an external server. The electronic apparatus 100 may receive the searched result from the external server in response to the query.

In addition, when a plurality of information pieces regarding the object are selected, the electronic apparatus 100 may search for an image related to the selected information pieces regarding the object using a search formula. Further, the electronic apparatus 100 may generate an album by selecting at least some of searched related images.

Meanwhile, according to various embodiments of the disclosure, the electronic apparatus 100 may acquire the information regarding the object by using the image or the information regarding a point, at which the user input is detected, in the recognition model as input data. Specifically, the electronic apparatus 100 may recognize the object by inputting the image and the information regarding a point at which the user input is detected to an object recognition model trained to recognize objects. In addition, the electronic apparatus 100 may recognize the context of the object by inputting the image and the information regarding the recognized object to a context recognition model trained to recognize context information of objects.

In this disclosure, the trained object recognition model or the context recognition model may be constructed by considering the application field of the recognition model or performance of a computer of the apparatus. For example, the trained context recognition model may be set to predict the context of the object by using the image and the information regarding the recognized object as input data. The trained recognition model may be a model based on the neural network. The recognition model may be designed to simulate a brain structure of human on the computer and may include a plurality of network nodes including weights and simulating neurons of the nerve network of human. The plurality of network nodes may form connections to each other to simulate a synaptic activity of neurons in that the neurons transmit and receive signals through synapse. In addition, the object recognition model may include, for example, a nerve network model or a deep learning model developed from the nerve network model. In a deep learning model, a plurality of network nodes may be positioned at depths (or on layers) different from each other and may transmit and receive data according to the convolution connection. Examples of the object recognition model include a deep neural network (DNN), a recurrent neural network (RNN), and a bidirectional recurrent deep neural network (BRDNN), but there is no limitation thereto.

In addition, the electronic apparatus 100 may use an artificial intelligence agent for searching for information related to the object selected by a user as described above. The artificial intelligence agent is a dedicated program for providing AI (artificial intelligence)-based services (for example, voice recognition service, assistant service, translation service, or searching service), and may be executed by a well-known generic-purpose processor (for example, a CPU) or a separate AI dedicated processor (for example, a GPU or the like). In particular, the artificial intelligence agent may control various modules which will be described later.

Specifically, when the object O is selected on the image by the predetermined user input (for example, long press or the like) or the object O is selected after a button (for example, button for executing the artificial intelligence agent) prepared on the electronic apparatus 100 pressed, the artificial intelligence agent may be operated. The artificial intelligence agent may identify an object region based on the user input, acquire recognition information of the object by recognizing the object based on the identified object region, and acquire context information of the object through the recognition model. The artificial intelligence agent may generate a separate graphic layer including the list L including the acquired information regarding the object and display the graphic layer on a graphic layer including the originally displayed image. When the information regarding the object is selected through the list L, the artificial intelligence agent may search for a related image based on the selected information regarding the object.

The artificial intelligence agent may also be operated when a specific icon is tapped on a screen or the button (for example, button for executing the artificial intelligence agent) prepared on the electronic apparatus 100 is pressed. Alternatively, the artificial intelligence agent may have been operated before the predetermined user input for the object O is detected or the button prepared on the electronic apparatus 100 is pressed. In this case, after the predetermined user input for the object O is detected or the button prepared on the electronic apparatus 100 is pressed, the artificial intelligence agent of the electronic apparatus 100 may execute a related image search function for the selected object. In addition, the artificial intelligence agent may be in a standby state before the predetermined user input for the object O is detected or the button prepared on the electronic apparatus 100 is pressed. The standby state here is a state for detecting the reception of the user input predefined for controlling an operation start of the artificial intelligence agent. When the predetermined user input for the object O is detected or the button prepared on the electronic apparatus 100 is selected while the artificial intelligence agent is in a standby state, the electronic apparatus 100 may operate the artificial intelligence agent and search for and provide an image related to the selected object.

Meanwhile, the artificial intelligence agent may control various modules which will be described later. This will be described later in detail.

In addition, specific examples for acquiring the searched result related to the object using the trained recognition model between the electronic apparatus 100 and the server will be described later with various embodiments.

Figure 2A:
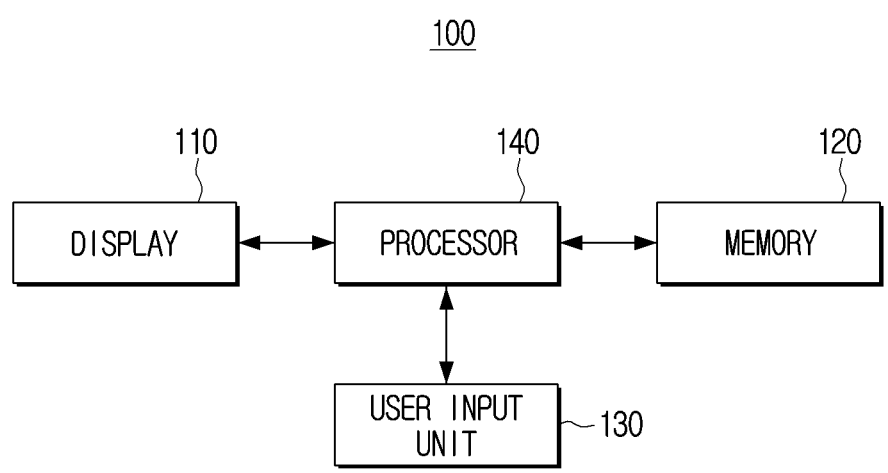
FIG. 2A is a block diagram schematically showing a configuration of the electronic apparatus according to an embodiment.

FIG. 2A is a block diagram showing the electronic apparatus 100 according to various embodiments. As shown in FIG. 2A, the electronic apparatus 100 includes a display 110, a memory 120, a user input unit 130, and a processor 140. The components shown in FIG. 2 are examples for implementing the embodiments of the disclosure and suitable hardware/software components that are clearly known for those skilled in the art may be additionally included to the electronic apparatus 100.

A display 110 may provide various screens. In particular, the display 110 may display an image (for example, a picture) including at least one object. In addition, the display 110 may display a list including information related to the object in the vicinity of the object selected by a user input among the at least one of objects. Further, the display 110 may display the image together with at least one image related to the information regarding the object selected by a user.

The memory 120 may store an instruction or data related to at least one other component of the electronic apparatus 100. In particular, the memory 120 may be implemented as a non-volatile memory, a volatile memory, a flash memory, a hard disk drive (HDD), or a solid-state drive (SDD). The memory 120 may be accessed by the processor 140 and reading, recording, editing, deleting, or updating of the data by the processor 140 may be executed. The term memory in this disclosure may include the memory 120, a ROM (not shown) or a RAM (not shown) in the processor 140, or a memory card (not shown) (for example, a micro SD card or a memory stick) mounted on the electronic apparatus 100. In addition, the memory 120 may store programs and data for configuring various screens to be displayed in a display region of the display 110.

The memory 120 may store the artificial intelligence agent for searching for an image related to information regarding an object and may store the recognition model (for example, object recognition model or context recognition model) of the disclosure.

Figure 2B:
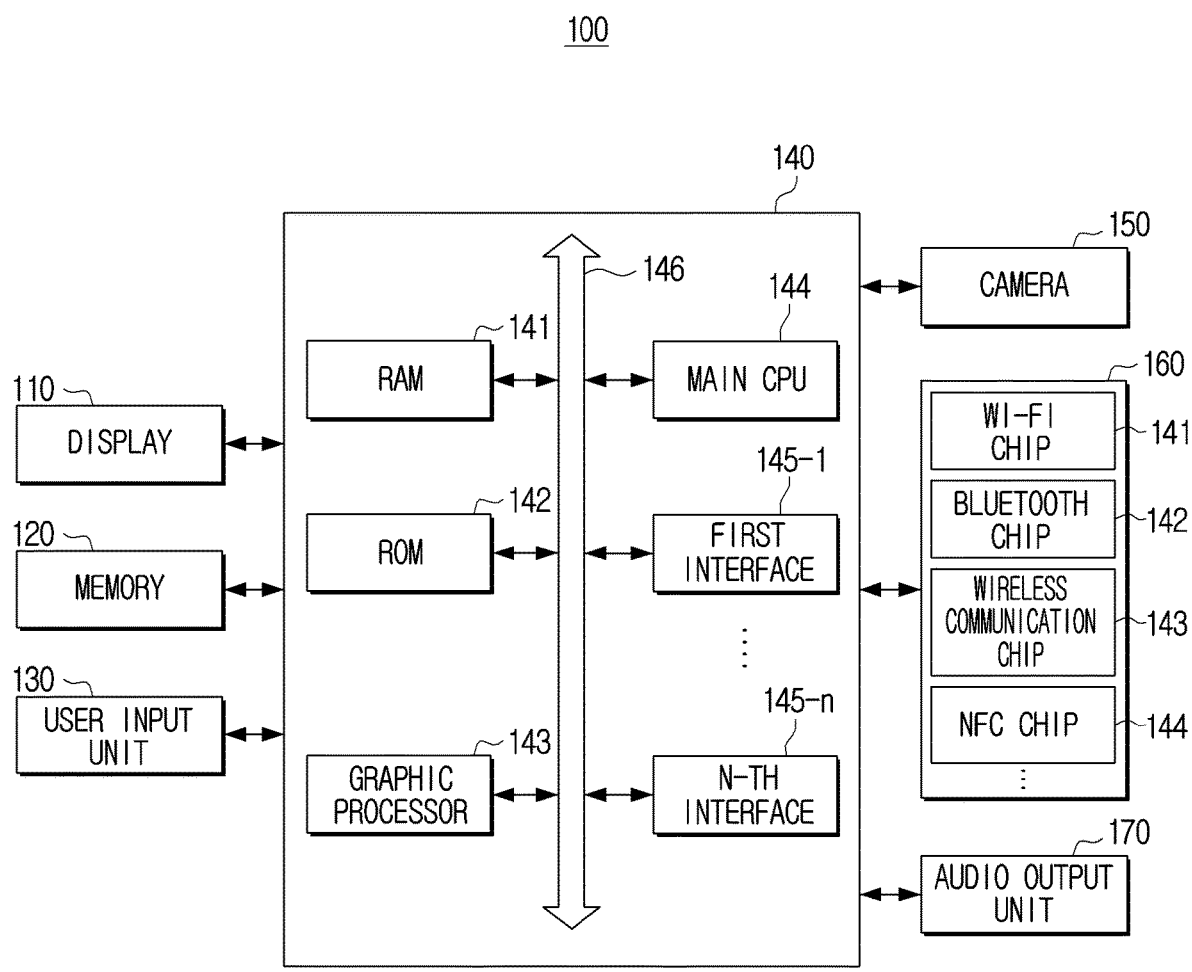
FIG. 2B is a block diagram specifically showing a configuration of the electronic apparatus according to an embodiment.
Figure 2C:
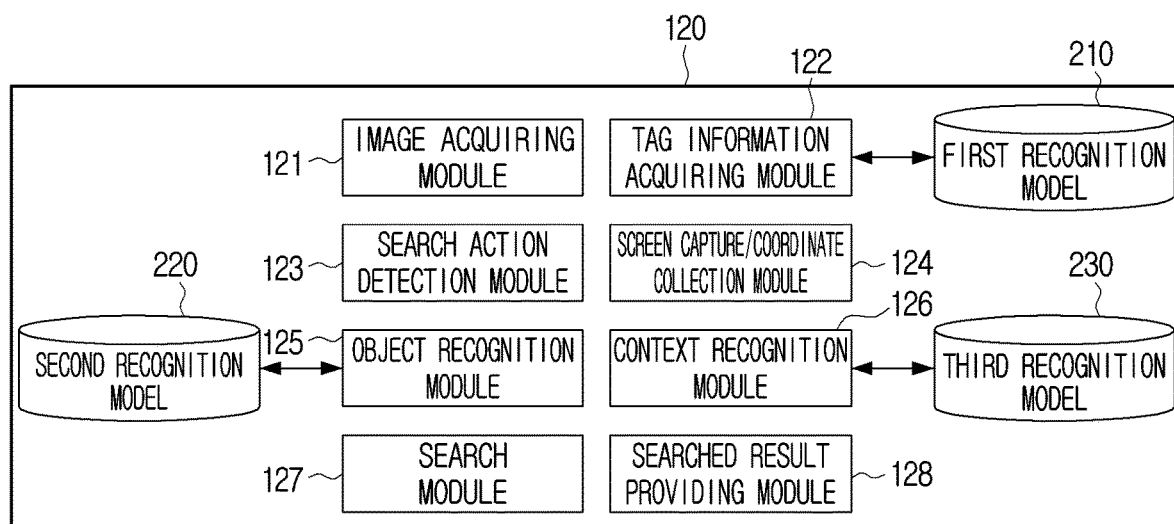
FIG. 2C is a block diagram including various modules for searching for an image related to an object selected by a user according to an embodiment.

Further, as shown in FIG. 2C, the memory 120 may store an image acquiring module 121, a tag information acquiring module 122, a search action detection module 123, a screen capture/coordinate collection module 124, an object recognition module 125, a context recognition module 126, a search module 127, and a searched result providing module 128.

When an image is captured through a camera 150, the image acquiring module 121 may acquire an image in a displayable form by processing the captured image. In addition, the image acquiring module 121 may store the acquired image in the memory 120.

The tag information acquiring module 122 may acquire tag information regarding the acquired image. Particularly, as shown in FIG. 2C, the tag information acquiring module 122 may acquire tag information using a first recognition model (for example, tag information recognition model) 210 trained to predict tag information. That is, the tag information acquiring module 122 may acquire tag information regarding the acquired image by inputting the acquired image in the first recognition model 210 as input data. The tag information here may include information or context information regarding at least one object included in the image. The tag information may be stored being matched with the corresponding image.

The search action detection module 123 may acquire an input signal according to a user input (for example, long press touch, multi-touch, pen action, or the like) for selecting an object included in the image displayed on the display 110 via the user input unit 130.

When the search action detection module 123 acquires the input signal, the screen capture/coordinate collection module 124 may collect a coordinate corresponding to a point (or a region) on the display 110 at which the user input is detected. In another example, the input signal is acquired through a physical button or a touch sensor on a bezel as the user input unit 130, and the screen capture/coordinate collection module 124 may collect a coordinate corresponding to a point (or a region) on the display 110 selected by a user according to the input signal additionally acquired via the user input unit 130.

In addition, the screen capture/coordinate collection module 124 may capture a screen and generate a captured image. For example, in a case of searching for a related image by linking to an external device, the screen capture/coordinate collection module 124 may capture an image currently displayed, and transmit the captured image to an external context recognition device.

The object recognition module 125 may recognize an object displayed at a point selected by a user. Specifically, the object recognition module 125 may identify an object region in which the object is displayed based on a coordinate value of the point selected by a user. In addition, the object recognition module 125 may recognize an object by inputting data regarding an object region to a second recognition model 220 (for example, object recognition model) trained to predict the object. At this time, the object recognition module 125 may acquire not only a type of the object, but also information regarding the object itself such as a color of the object, a size of the object, a name of the object, a gender of the object, and the like.

The context recognition module 126 may recognize context information regarding an object. Specifically, the context recognition module 126 may acquire context information regarding an object by inputting image and data regarding the object region to a third recognition model 230 (for example, context recognition model) trained to predict the context information of the object. The context information regarding an object may include not only context information regarding the object itself, such as an emotion of the object, face expression of the object, a location of the object, a movement of the object, and clothes of the object, but also context information such as a relationship between the object and the environment of the object.

In the embodiment described above, it is described that the object recognition module 125 and the context recognition module 126 are separate components and acquire the information regarding the object using different recognition models, but this is merely an embodiment, and these may be implemented as one component (for example, object/context recognition module), and in this case, the object/context recognition module may acquire information regarding an object including both object recognition information and the context information of the object though one recognition model.

The search module 127 may search for a related image based on information selected by a user from the acquired information regarding the object. In an example, the search module 127 may search for a related image based on tag information regarding a plurality of images stored in the memory 120 and the selected information. That is, the search module 127 may search for an image having tag information identical to the selected information or an image having tag information related to the selected information. In another example, the search module 127 may generate a query including the selected information regarding the object and transmit the query to an external search server. The search module 127 may receive a searched result as a response to the query from the external search server.

The searched result providing module 128 may provide a related image (or searched result) searched by the search module 127 on the display 110. In particular, the searched result providing module 128 may display the searched related image in a separate region from the image displayed on the display 110, but this is merely an embodiment, and the searched result providing module 128 may generate a pop-up window including the searched related image and provide the pop-up window on the image. In addition, the searched result providing module 128 may provide information regarding the searched result via an output device such as a speaker or a haptic providing unit.

The first recognition model 210, the second recognition model 220, and the third recognition model 230 described above may be stored in the electronic apparatus 100, but this is merely an embodiment, and these may be stored in an external server. In addition, at least two among the plurality of recognition models 210 to 230 may be implemented as an integrated recognition model. For example, the object recognition model and the context recognition model may be integrally implemented as an object/context recognition model. A method for training a plurality of recognition models using input data for recognition will be described later in detail with reference to the drawings.

Returning to FIG. 2A, the user input unit 130 may receive various user inputs and transmit the user inputs to the processor 140. In particular, the user input unit 130 may include a touch sensor, a (digital) pen sensor, a pressure sensor, or a key. The touch sensor may use at least one type of, for example, an electrostatic type, a pressure-sensitive type, an infrared type, or an ultrasonic type. The (digital) pen sensor may be, for example, a part of a touch panel or include a separate sheet for recognition. The key may include, for example, a physical button, an optical key, or a keypad.

Particularly, the user input unit 130 may acquire an input signal according to a user input that is padding an object, after a predetermined user touch (for example, a long press touch) or pressing a specific button (for example, button for executing artificial intelligence service) for selecting an object. The user input unit 130 may transmit the input signal to the processor 140.

The processor 140 may be electrically connected to the display 110, the memory 120, and the user input unit 130 and may control general operations and functions of the electronic apparatus 100. Particularly, the processor 140 may execute a function of searching for an image related to an object selected by a user by using the image acquiring module 121, the tag information acquiring module 122, the search action detection module 123, the screen capture/coordinate collection module 124, the object recognition module 125, the context recognition module 126, the search module 127, and the searched result providing module 128. In particular, the processor 140 may acquire an input signal according to a user input for selecting an object by using the user input unit 130 while an image including at least one object is displayed on the display 110, recognize an object displayed at a point at which the user input is detected and acquire the recognized object by using a recognition model trained to acquire information regarding an object in response to the input signal, control the display 110 to display a list including the information regarding the object, and, based on one piece of information selected from the information regarding the object included in the list via the user input unit, search for a related image based on the selected information. A method for searching for a related image by the processor 140 will be described later in detail.

FIG. 2B is a block diagram specifically showing a configuration of the electronic apparatus 100 according to an embodiment of the disclosure. As shown in FIG. 2B, the electronic apparatus 100 may include the display 110, the memory 120, the user input unit 130, the processor 140, the camera 150, a communicator 160, and an audio output unit 170. The display 110, the memory 120, and the user input unit 130 have been described with FIG. 2B, and thus the overlapped description will be omitted.

The camera 150 may capture an image including at least one object. The camera 150 may be prepared on at least one of a front side or a rear side of the electronic apparatus 100. The camera 150 may be prepared in the electronic apparatus 100, but this is merely an embodiment, and the electronic apparatus 100 may exist outside and be connected to the electronic apparatus 100 in a wired or wireless manner.

The communicator 160 may execute communication with various types of external devices according to various types of communication methods. The communicator 160 may include at least one of a Wi-Fi chip 161, a Bluetooth chip 162, a wireless communication chip 163, and an NFC chip 164. The processor 140 may execute communication with an external server or various external devices using the communicator 160.

Particularly, the communicator 160 may execute communication with an external context recognition device, an external search server, or an external cloud server.

The audio output unit 170 may output not only various pieces of audio data obtained by executing various processing such as decoding, amplification, or noise filtering by an audio processor (not shown), but also various alerts or voice messages. Particularly, the audio output unit 170 may be implemented as a speaker, but this is merely an embodiment, and the audio output unit 170 may be implemented as an output terminal capable of outputting audio data.

In particular, the audio output unit 170 may provide the information regarding the searched result to a user in a form of a sound.

The processor 140 (or controller) may control general operations of the electronic apparatus 100 using various programs stored in the memory 120.

The processor 140 may consist of a RAM 141, a ROM 142, a graphic processor 143, a main CPU 144, first to n-th interfaces 145-1 to 145-n, and a bus 146. The RAM 141, the ROM 142, the graphic processor 143, the main CPU 144, and the first to n-th interfaces 145-1 to 145-n may be connected to each other via the bus 146.

Figure 3:
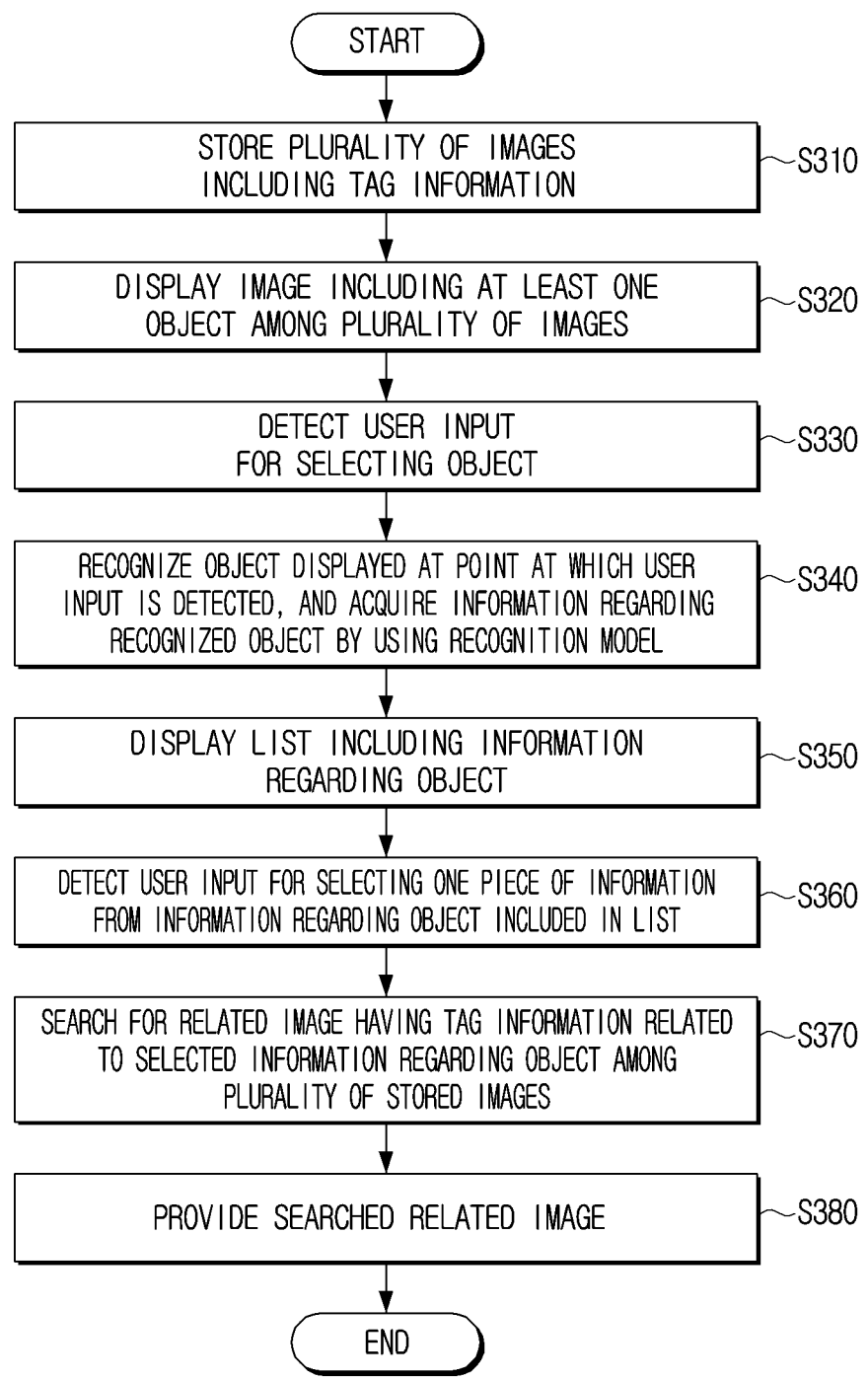
FIGS. 3, 4 and 5 are flowcharts for explaining a method for searching for an image related to an object selected by a user according to embodiments.

FIG. 3 is a diagram for explaining a method for searching for an image related to an object by the electronic apparatus according to an embodiment of the disclosure. In particular, in this embodiment, an image related to an object included in an image may be searched, when an image is displayed while executing a gallery application.

First, the electronic apparatus 100 may store a plurality of images including tag information (S310). Specifically, when acquiring an image, the electronic apparatus 100 may recognize information and the context information regarding the object included in the image by inputting the acquired image to the tag information recognition model, and acquire the recognized information and the context information regarding the object as tag information and store the information with the image. Alternatively, when acquiring an image from the outside, the electronic apparatus 100 may receive and store tag information regarding an image.

The electronic apparatus 100 may display an image including at least one object among a plurality of images (S320). The electronic apparatus 100 may execute a gallery application and display an image including at least one object while executing the gallery application.

The electronic apparatus 100 may detect a user input for selecting an object (S330). The user input for selecting an object may be a long press touch that is to tap and hold a point of a region, where the object is displayed, down for a certain period of time or longer, a multi-touch that is to tap a point of a region, where the object is displayed, multiple times, or a drawing touch that is to draw on a region where the object is displayed. In particular, when the user input for selecting the object is detected, the electronic apparatus 100 may execute the artificial intelligence agent.

The electronic apparatus 100 may recognize the object displayed at a point at which the user input is detected, and acquire information regarding the recognized object by using the recognition model (S340). Specifically, the electronic apparatus 100 may identify an object region where the object is displayed, based on a coordinate value of a point at which the user input is detected, and recognize an object displayed in the object region by inputting the identified object region to the object recognition model. At this time, the electronic apparatus 100 may acquire recognition information for the object (for example, a type, a color, a size, a gender, a name, and the like of the object). In addition, the electronic apparatus 100 may acquire context information of the object (for example, an emotion, face expression, clothes, a movement, and the like of the object) by inputting the object region and data for the image to the context recognition model.

The electronic apparatus 100 may display a list including the information regarding the object (S350). At this time, the electronic apparatus 100 may display a list including the information regarding the object in the vicinity of the selected object. In addition, the electronic apparatus 100 may display a list by generating a graphic layer different from the image including at least one object.

The electronic apparatus 100 may detect the user input for selecting one piece of information from the information regarding the object included in the list (S360).

The electronic apparatus 100 may search for a related image having tag information related to the selected information regarding the object among a plurality of stored images (S370). Specifically, the electronic apparatus 100 may search for a related image having tag information identical to the selected information regarding the object or having tag information related to the selected information regarding the object. For example, when the information regarding the object selected by a user is a "smiling baby", the electronic apparatus 100 may search for a related image having tag information identical to the "smiling baby" or having tag information related to the "smiling baby" (for example, baby laughter, baby smile, or the like).

The electronic apparatus 100 may provide the searched related image (S380). Specifically, the electronic apparatus 100 may display the searched related image in a search region by reducing a size of the currently displayed image and generating the search region for displaying the searched related image.

Figure 4:
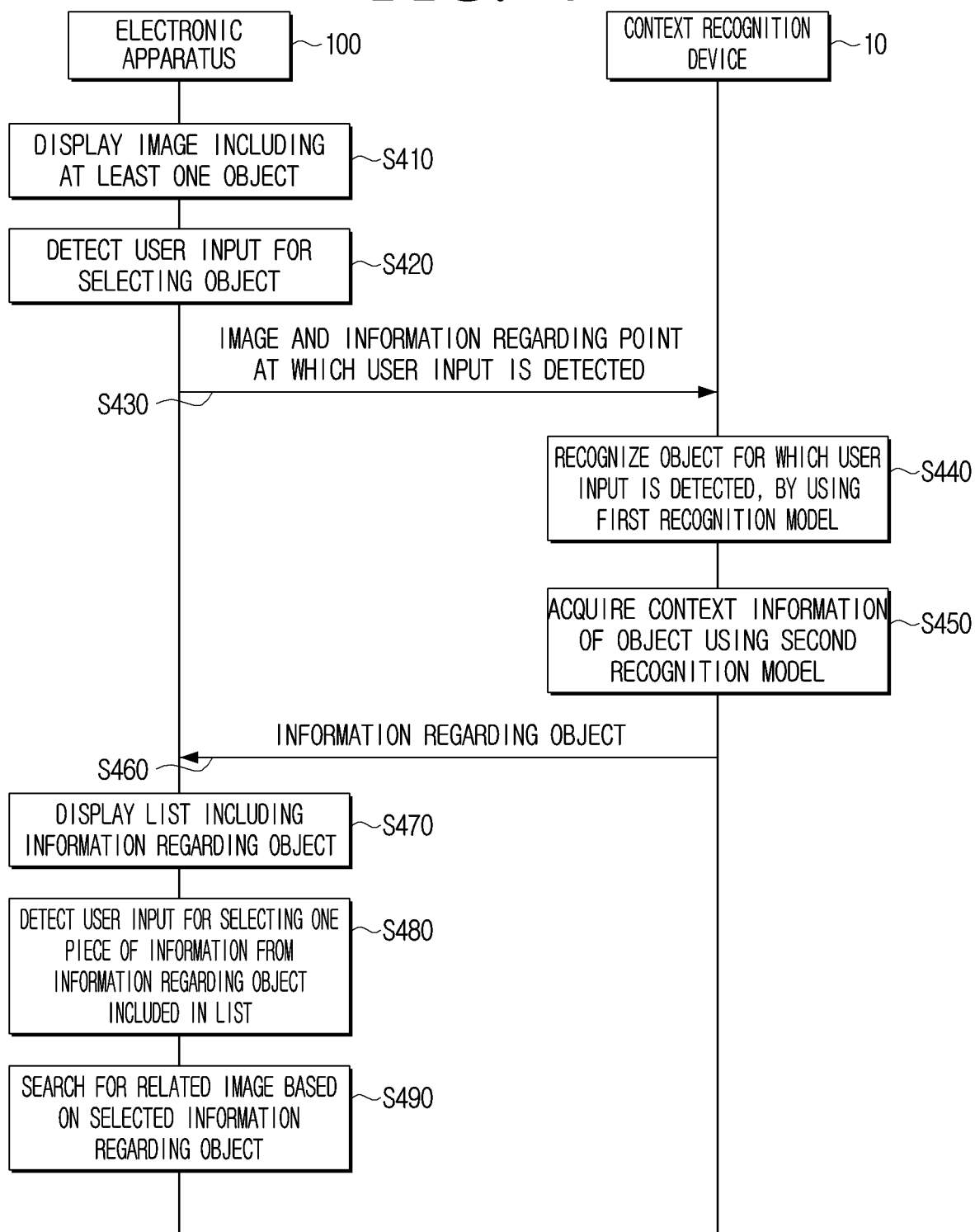

FIG. 4 is a diagram for explaining an embodiment of acquiring information regarding an object through a context recognition device according to an embodiment of the disclosure. A context recognition device 10 may be an external server connected to the electronic apparatus 100 for communication.

The electronic apparatus 100 may display an image including at least one object among a plurality of images (S410). The electronic apparatus 100 may display an image including at least one object while a gallery application is executed, or may display an image included in a web page while a web application is executed.

The electronic apparatus 100 may detect a user input for selecting the object (S420). The user input for selecting an object may be a long press touch that is to tap and hold a point of a region, where the object is displayed, down for a certain period of time or longer, a multi-touch that is to tap a point of a region, where the object is displayed, multiple times, or a drawing touch that is to draw on a region where the object is displayed, but is not limited thereto.

The electronic apparatus 100 may transmit the image and information regarding a point at which the user input is detected to the context recognition device 10 (S430). Specifically, the electronic apparatus 100 may transmit image data and coordinate value information of a point at which the user input is detected to the external context recognition device 10, in order to acquire information regarding the object.

The context recognition device 10 may recognize an object for which the user input is detected, by using the first recognition model (for example, object recognition model) (S440). Specifically, the context recognition device 10 may identify an object region where the user input is detected, based on the image and the information regarding a point at which the user input is detected. When the object region is identified, the context recognition device 10 may recognize an object by inputting image data in the object region to the object recognition model. The context recognition device 10 may acquire recognition information regarding the object (for example, a type of the object, a color of the object, a size of the object, a name of the object, a gender of the object, and the like) by recognizing the object.

In another embodiment, the electronic apparatus 100 may identify the object region and transmit information regarding the object region and image data to the context recognition device 10, and the context recognition device 10 may acquire information regarding the object based on the information regarding the object region and the image data.

The context recognition device 10 may acquire context information of the object using the second recognition model (for example, context recognition model) (S450). Specifically, the context recognition device 10 may acquire context information of the object (for example, face expression, an emotion, clothes, and movement of the object, a relationship with neighboring object, and the like) by inputting the image data and the recognition information regarding the object to the context recognition model.

The context recognition device 10 may transmit the acquired information regarding the object to the electronic apparatus 100 (S460). The information regarding the object may include the recognition information regarding the object and the context information regarding the object.

The electronic apparatus 100 may display a list including the information regarding the object (S470). The electronic apparatus 100 may display a list including the information regarding the object in the vicinity of the selected object.

The electronic apparatus 100 may detect a user input for selecting one piece of information from the information regarding the object included in the list (S480).

The electronic apparatus 100 may search for a related image based on the selected information regarding the object (S490). Specifically, the electronic apparatus 100 may search for a related image having tag information related to the selected information regarding the object among the plurality of stored images, and may search for a related image by transmitting a query including the selected information regarding the object to an external search server.

Figure 5:
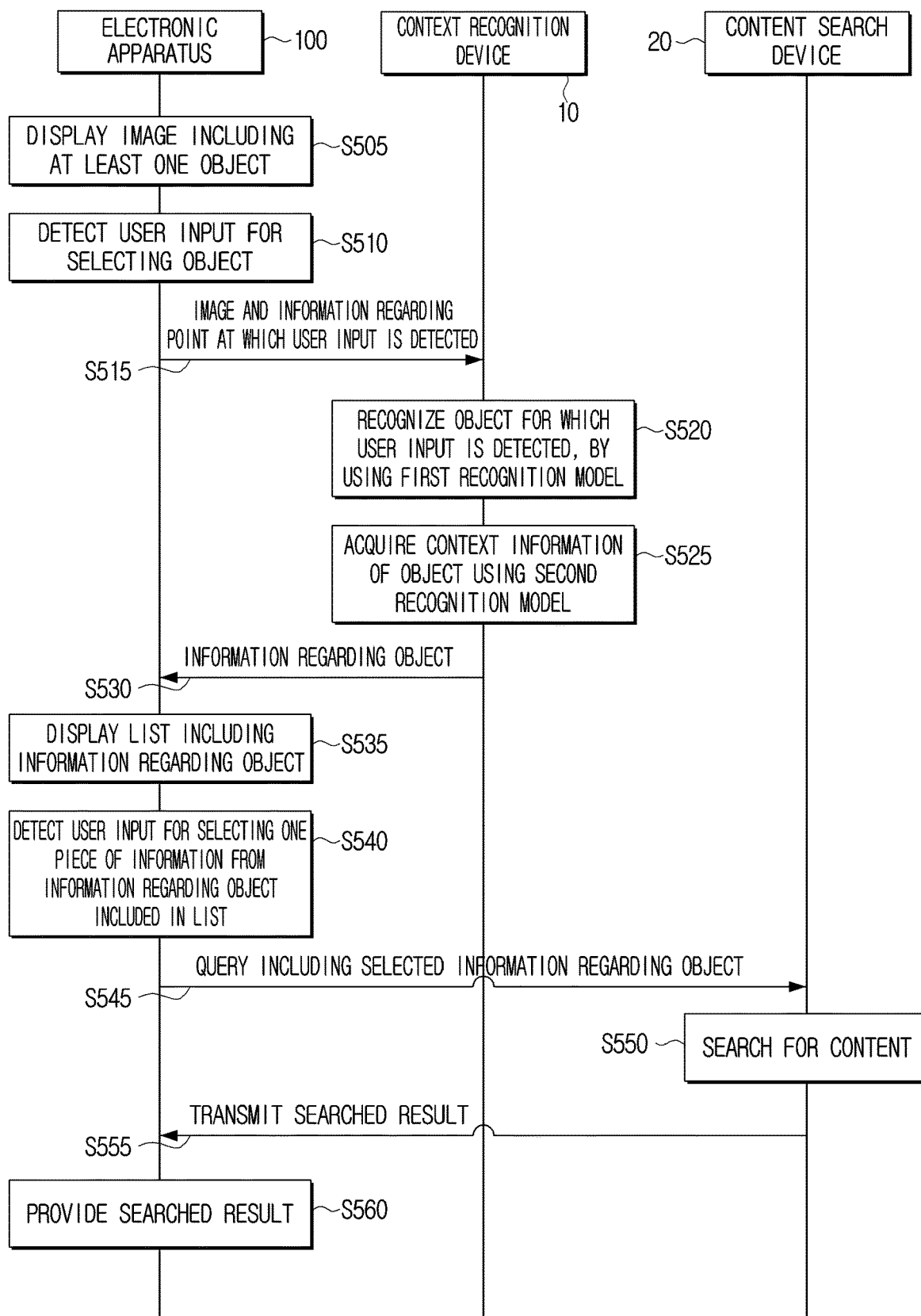

FIG. 5 is a diagram for explaining an embodiment of acquiring the information regarding the object through the context recognition device and searching for a related image through a content search device according to an embodiment of the disclosure. In particular, in this embodiment, an image related to an object included in an image may be searched, when an image is displayed while executing a web application. The context recognition device 10 and a content search device 20 may be external servers connected to the electronic apparatus 100 for communication and may be implemented as separate servers, but this is merely an embodiment, and these may be implemented as one server.

The electronic apparatus 100 may display an image including at least one object among a plurality of images (S505). The electronic apparatus 100 may display an image included in a web page while a web application is executed.

The electronic apparatus 100 may detect a user input for selecting the object (S510). The user input for selecting an object may be a long press touch, a multi-touch, or a drawing touch, as described above, but is not limited thereto. In another embodiment, when the user input for selecting the object is detected, the electronic apparatus 100 may capture a page currently displayed and acquire a captured image.

The electronic apparatus 100 may transmit the image and information regarding a point at which the user input is detected to the context recognition device 10 (S515). Specifically, the electronic apparatus 100 may transmit the captured image and coordinate value information of a point at which the user input is detected to the external context recognition device 10, in order to acquire information regarding the object.

The context recognition device 10 may recognize an object for which the user input is detected, by using the first recognition model (for example, object recognition model) (S520). Specifically, the context recognition device 10 may identify an object region where the user input is detected, based on the captured image and the information regarding a point at which the user input is detected, and recognize the object by inputting image data in the object region to the object recognition model.

The context recognition device 10 may acquire context information of the object using the second recognition model (for example, context recognition model) (S525). Specifically, the context recognition device 10 may acquire context information of the object (for example, face expression, an emotion, clothes, and movement of the object, a relationship with neighboring object, and the like) by inputting the captured image and the recognition information regarding the object to the context recognition model. The context recognition device 10 may acquire the context information of the object using not only information regarding the object included in the captured image, but also the surrounding information (for example, text and the like).

The context recognition device 10 may transmit the acquired information regarding the object to the electronic apparatus 100 (S530). The information regarding the object may include the recognition information regarding the object and the context information regarding the object.

The electronic apparatus 100 may display a list including the information regarding the object (S535). The electronic apparatus 100 may display a list including the information regarding the object in the vicinity of the selected object.

The electronic apparatus 100 may detect a user input for selecting one piece of information from the information regarding the object included in the list (S540).

The electronic apparatus 100 may transmit a query including the selected information regarding the object to the content search device 20 (S545).

The content search device 20 may search for a content in response to the query (S550). The content search device 20 may search for an image content having a title, a text, or tag information related to the selected information regarding the object, but there is no limitation thereto, and the content search device 20 may search for various contents such as a video content or a music content.

The content search device 20 may transmit the searched result to the electronic apparatus 100 (S555) and the electronic apparatus 100 may provide the received searched result (S560). The electronic apparatus 100 may provide the received search result as a separate web page, but this is merely an embodiment, and the electronic apparatus 100 may provide the searched result through a pop-up window.

Figure 6:
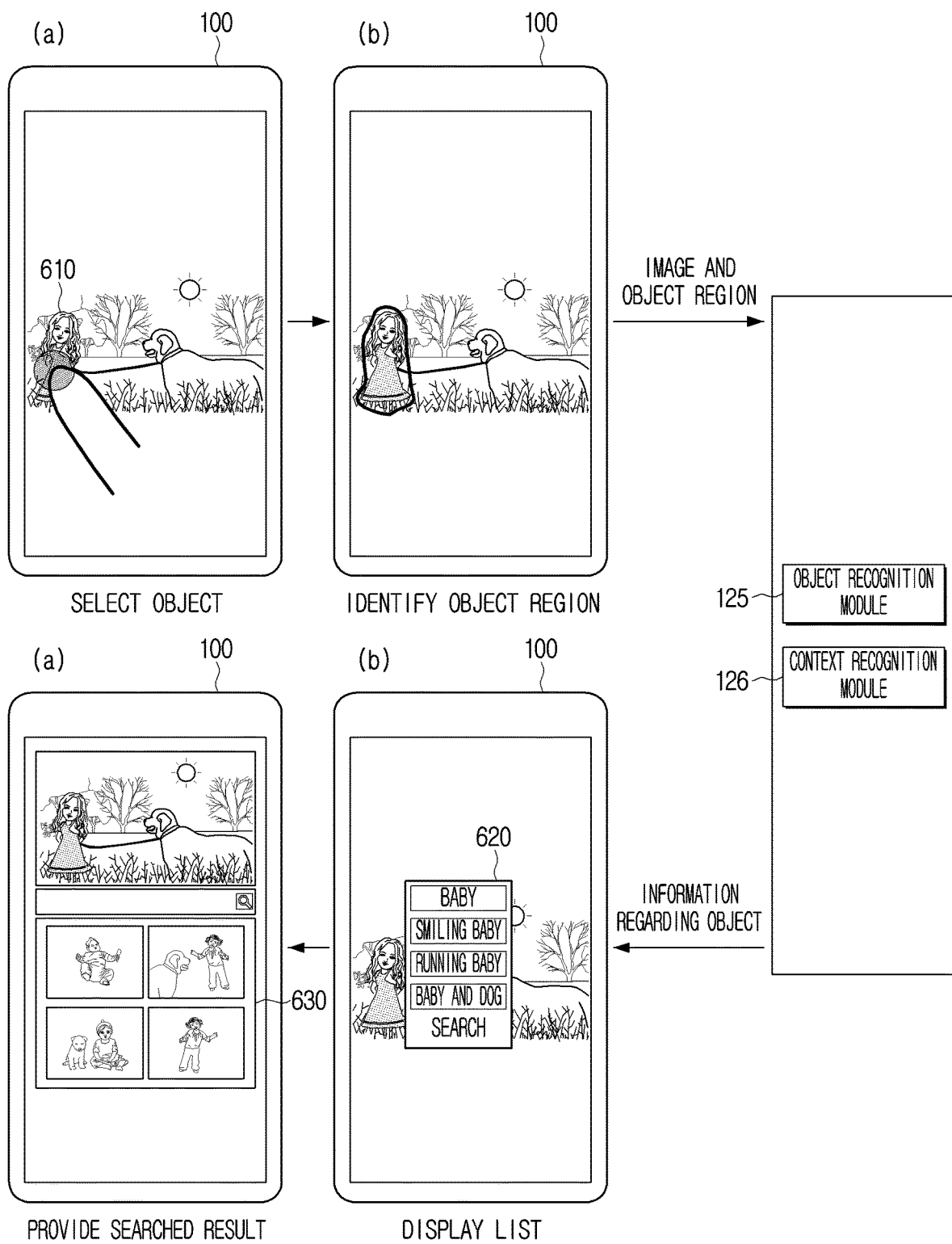
FIG. 6 is a diagram for explaining an embodiment for searching for an image related to an object selected by a user among images in the electronic apparatus according to an embodiment.

FIG. 6 is a diagram for explaining an embodiment for searching for an image related to an object selected by a user among images in the electronic apparatus according to an embodiment of the disclosure.

The electronic apparatus 100 may execute a gallery application according to the user input. The electronic apparatus 100 may display one of a plurality of images stored in the electronic apparatus 100, while the gallery application is executed. The displayed image may include at least one object. For example, as shown in (a) of FIG. 6, the image may include a baby object, a puppy object, and a sun object.

As shown in (a) of FIG. 6, the electronic apparatus 100 may detect the user input for selecting a baby object 610 among the plurality of objects included in the image. The user input may be a long press touch that is to tap and hold a point down for a certain period of time or longer, a multi-touch that is to tap a point multiple times within a predetermined period of time, or a drawing touch that is to draw on a region where the object is included, but there is no limitation thereto. When the user input for selecting one among the plurality of objects is detected, the electronic apparatus 100 may execute an artificial intelligence agent (for example, Bixby™ or the like) for searching for a related image.

As shown in (b) of FIG. 6, the electronic apparatus 100 may identify an object region including the selected object 610 based on a coordinate value where the user input is detected.

The electronic apparatus 100 may recognize the object 610 displayed in the object region using information regarding the object region through the object recognition module 125. In particular, the object recognition module 125 may input data regarding the object region to the object recognition model as input data and acquire recognition information of the object as an input result. The recognition information of the object may include a type, a color, a size, a name, a gender, or the like of the object. For example, the electronic apparatus 100 may identify that the object 610 included in the object region is a "baby" by inputting the information regarding the object region identified in (b) of FIG. 6 to the object recognition model.

The electronic apparatus 100 may acquire the context information of the object through the context recognition module 126 using the recognition information of the object and the data regarding the image. In particular, the context recognition module 126 may input the recognition information of the object and the data regarding the image to the context recognition model and acquire context information of the object as an input result. The context information of the object may include face expression, an emotion, clothes, movement, and a location of the object, a relationship with another object, and the like. For example, the electronic apparatus 100 may acquire "smiling baby", "running baby", and "puppy and baby" as the context information of the object through the context recognition module 126.

As shown in (c) of FIG. 6, the electronic apparatus 100 may display a list 620 including the acquired information regarding the object in the vicinity of the selected object. For example, the list 620 may include "baby", "smiling baby", "running baby", and "puppy and baby" which are information regarding the object acquired through the object recognition module 125 and the context recognition module 126 described above. The list 620 may be included in a graphic layer generated separately from the originally displayed image.

The electronic apparatus 100 may detect the user input for selecting one piece of information from the acquired information regarding the object. The user input for selecting one piece of information from the information regarding the object included in the list 620 may be tapping, but is not limited thereto. For example, the electronic apparatus 100 may detect the user input for selecting the information regarding the object which is "smiling baby".

The electronic apparatus 100 may search for a related image based on the selected information regarding the object. Specifically, the electronic apparatus 100 may search for an image having tag information identical or similar to the selected information regarding the object among the plurality of images stored in the electronic apparatus 100. For example, the electronic apparatus 100 may search for an image having tag information identical to the "smiling baby which is the selected information regarding the object, or having tag information such as "baby smile", "baby laughter", and "smiling child" which are tag information similar to the "smiling baby".

As shown in (d) of FIG. 6, the electronic apparatus 100 may provide a searched result 630. The electronic apparatus 100 may provide the searched result 630 in a separate region by reducing a size of the originally displayed image. The electronic apparatus 100 may provide the searched result 630 in a separate region from the originally displayed image, but this is merely an embodiment, and the electronic apparatus 100 may generate a pop-up window including the searched result.

Figure 7:
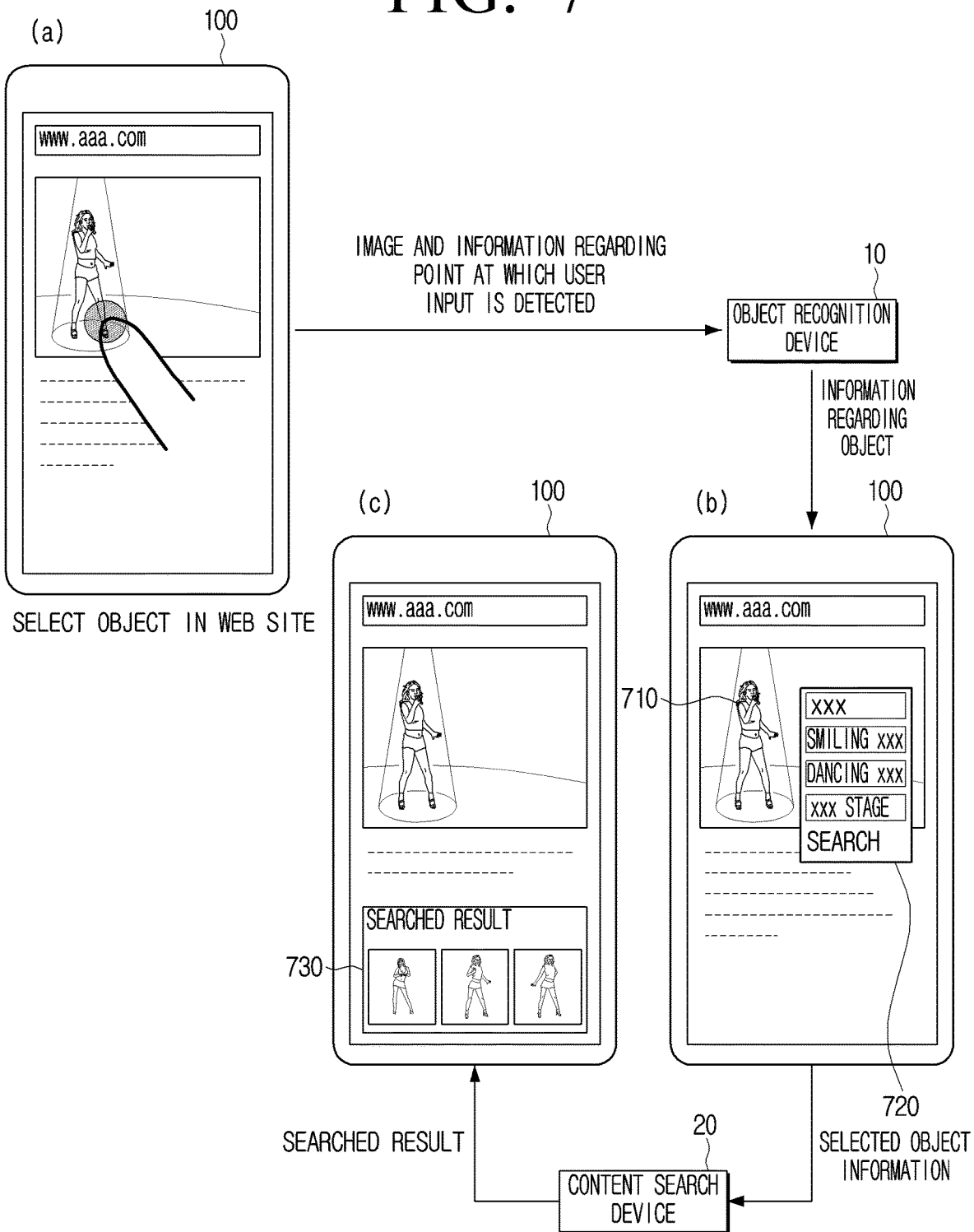
FIG. 7 is a diagram for explaining an embodiment for searching for an external image related to an object selected by a user according to an embodiment.

FIG. 7 is a diagram for explaining an embodiment for searching for an external image related to an object selected by a user according to an embodiment of the disclosure.

The electronic apparatus 100 may display a web site including an image while the web application is executed. At least one object may be displayed in the image.

The electronic apparatus 100 may detect a user input for selecting a "person object" 710 from the image on the web page. The user input may be a long press touch, a multi-touch, or a drawing touch, but is not limited thereto.

In an embodiment of the disclosure, the electronic apparatus 100 may capture a web page including the object 710 and generate a captured image in response to the user input. The electronic apparatus 100 may execute the capturing of the web page through a background thread.

The electronic apparatus 100 may transmit the image (e.g., captured image) and information regarding a point at which the user input is detected (e.g., coordinate value information) to the object recognition device 10.

The object recognition device 10 may identify (extract) an object region based on the image and the information regarding a point at which the user input is detected, and may acquire recognition information of the object by inputting the identified object region to the object recognition model. For example, the object recognition device 10 may acquire "XXX" which is a name as the recognition information of the object.

The object recognition device 10 may acquire context information of the object by inputting the image and the information regarding the object region to the context recognition model. The object recognition device 10 may acquire the context information of the object using not only the information regarding the object region but also other information included in the captured image (for example, text). For example, the object recognition device 10 may acquire the context information of the object 710 such as "smiling XXX", "dancing XXX", and "XXX stage".

The object recognition device 10 may transmit the information regarding the object (recognition information of the object and context information of the object) to the electronic apparatus 100.

As shown in (b) of FIG. 7, the electronic apparatus 100 may display a list 720 including the acquired information regarding the object in the vicinity of the selected object 710. For example, the list 720 may include "XXX", "smiling XXX", "dancing XXX", and "XXX stage" which are information regarding the object acquired through the object recognition device 10 described above. The list 720 may be included in a graphic layer generated separately from the originally displayed image.

The electronic apparatus 100 may detect a user input for selecting one piece of information from the acquired information regarding the object. The user input for selecting one piece of information from the information regarding the object included in the list 720 may be tapping, but is not limited thereto. For example, the electronic apparatus 100 may detect the user input for selecting the information regarding the object which is "smiling baby".

The electronic apparatus 100 may transmit a query including the selected information regarding the object to the external content search device 20.

The content search device 20 may search for an image related to the selected information regarding the object in response to the query. For example, the content search device 20 may search for an image or a web page having a title, a text, or tag information such as "smiling XXX".

The content search device 20 may transmit the searched result to the electronic apparatus 100.

The electronic apparatus 100 may provide the searched result 730 as a separate pop-up window, as shown in (c) of FIG. 7. However, to provide the searched result 730 as a separate pop-up window is merely an embodiment, and the searched result 730 may be provided by generating a separate web page.

Figure 8:
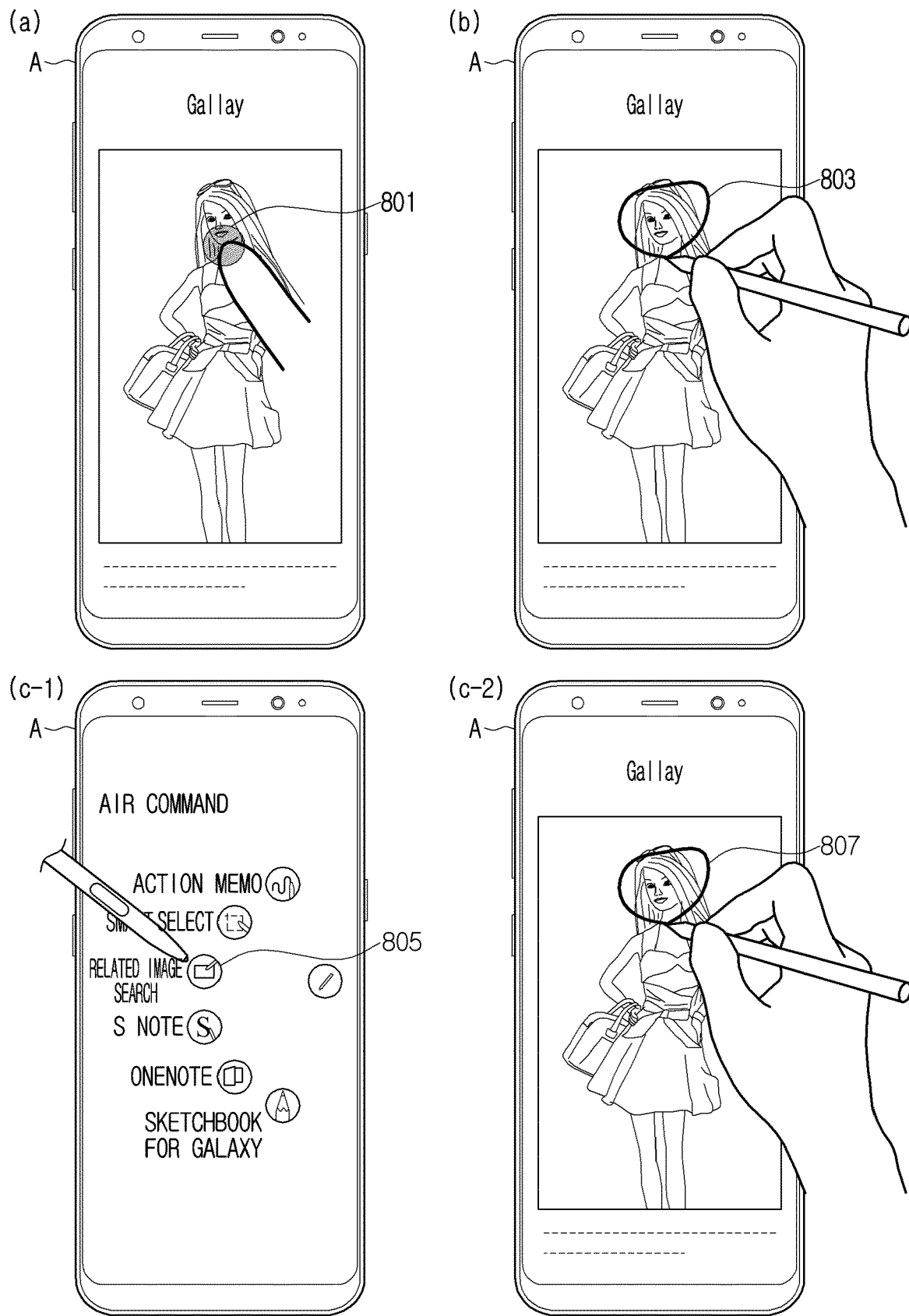
FIG. 8 is a diagram for explaining a user input for selecting an object according to embodiments.

FIG. 8 is a diagram for explaining a user input for selecting an object according to embodiments of the disclosure.

According to an embodiment of the disclosure, as shown in (a) of FIG. 8, a user may tap (e.g., long press touch or multi-touch) a point 801 of an image in which an object is displayed, in order to select the object. Alternatively, as shown in (b) of FIG. 8, a user may draw on a part 803 of a display region in which the object is displayed, by using an electronic pen.

Alternatively, as shown in (c-1) of FIG. 8, the electronic apparatus 100 may provide a UI (e.g., icon) 805 for providing a searched result related to an object on a screen. For example, when a user removes the electronic pen from the electronic apparatus 100, the electronic apparatus 100 may display the UI 805 providing a related image search function based on an event occurring according to the removal of the electronic pen. In another example, the electronic apparatus 100 may display the UI 805 providing the related image search function according to a user input that is dragging from a side (e.g., edge region) of the display region to the center. In still another example, the electronic apparatus 100 may display the UI 805 providing the related image search function according to a user input that is selecting a button prepared in one region of the electronic apparatus 100.

In such a state, when a user selects the UI 805, the electronic apparatus 100 captures a screen including the object that is displayed in the display region before the UI display, and as shown in (c-2) of FIG. 8, the electronic apparatus 100 may display the captured image as a screen capture result. When the captured image is displayed, for example, a user may select the object by drawing one region 807 of the captured image with the electronic pen.

Figure 9B:

FIGS. 9A and 9B are diagrams for explaining a method for searching for a related image by using a search formula according to an embodiment of the disclosure.

First, as shown in (a) of FIG. 9A, the electronic apparatus 100 may display a list 910 including the information regarding the object acquired by the method described above. For example, the electronic apparatus 100 may acquire information such as "baby", "smiling baby", and "white baby" as the information regarding the object in the list 910.

The electronic apparatus 100 may detect a user input for selecting "smiling baby" from the information regarding the object included in the list.

When a user input for selecting "smiling baby" is detected, as shown in (b) of FIG. 9A, the electronic apparatus 100 may display a screen including an image display region 920, a search box 930, and a searched result display region 940. A reduced image shown in (a) of FIG. 9A may be displayed in the image display region 920, the information regarding the object (that is, "smiling baby") selected by a user may be displayed in the search box 930, and related images 940-1 to 940-4 searched based on the selected information regarding the object may be displayed in the searched result display region 940.

As shown in (c) of FIG. 9A, the electronic apparatus 100 may input "+" as a symbol to input a search condition of "and" for adding a specific condition to the search box 930 according to a user input. A user may input "+" for the search condition of "and", but this is merely an embodiment and a symbol such as "*" or a text such as "and" may be input.

In another embodiment, a user may input "−" or "not" as a symbol for inputting a search condition of "not" for excluding a specific condition from the searched result. In still another embodiment, a user may input "+", "*", and "or" as a search condition of "or". However, the search condition is not limited to the above description, and other search conditions can be applied to technical spirits of the disclosure.

After the search condition of "and" is input, when a user input for selecting a puppy object is detected, as shown in (d) of FIG. 9A, the electronic apparatus 100 may display a list 950 including information regarding the puppy object in the image display region 920. For example, the list 950 may include information such as "puppy", "running puppy", and "Maltese".

When "puppy" is selected from the information included in the list 950, as shown in (e) of FIG. 9A, and the electronic apparatus 100 may display a search formula (smiling baby+puppy) in the search box 930 and display related images 940-5 to 940-7 searched by the search formula in the searched result providing region 940. When "puppy" is selected from the information included in the list 950, the electronic apparatus 100 may directly update the search formula and the related images 940-5 to 940-7 searched by the search formula, but this is merely an embodiment, and when an icon for executing the search is selected in the search box 930 after completing the search formula, the electronic apparatus 100 may update the searched result providing region 940 by executing a search for related images.

In the embodiment described above, it is described that a user directly inputs a symbol or text used in the search formula for writing the search formula, but this is merely an embodiment, as shown in FIG. 9B, the electronic apparatus 100 may generate a list 960 including search conditions. Specifically, the list 960 may include icons for adding or excluding each of information regarding the object, and when one of the plurality of icons is selected, the electronic apparatus 100 may input the information regarding the object and the search condition corresponding to the selected icon to the search box. For example, when an icon of "+" displayed next to the smiling baby is selected, the electronic apparatus 100 may input "+smiling baby" to the search box 930.

Figure 10A:
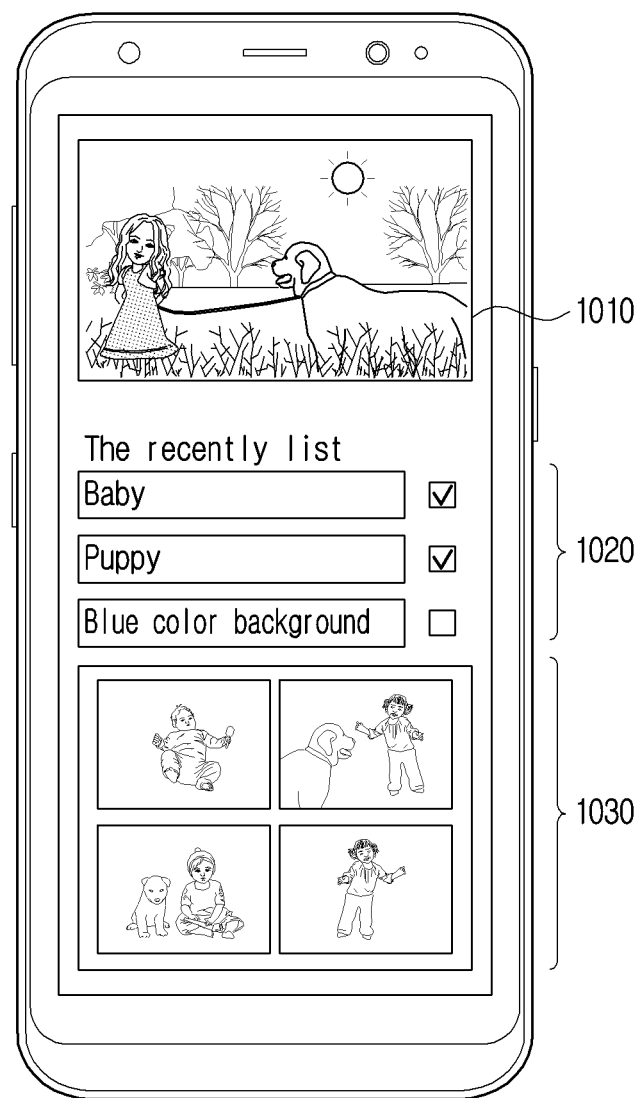
FIGS. 10A and 10B are diagrams for explaining a method for searching for a related image by using a search history or a recommended keyword according to an embodiment.
Figure 10B:
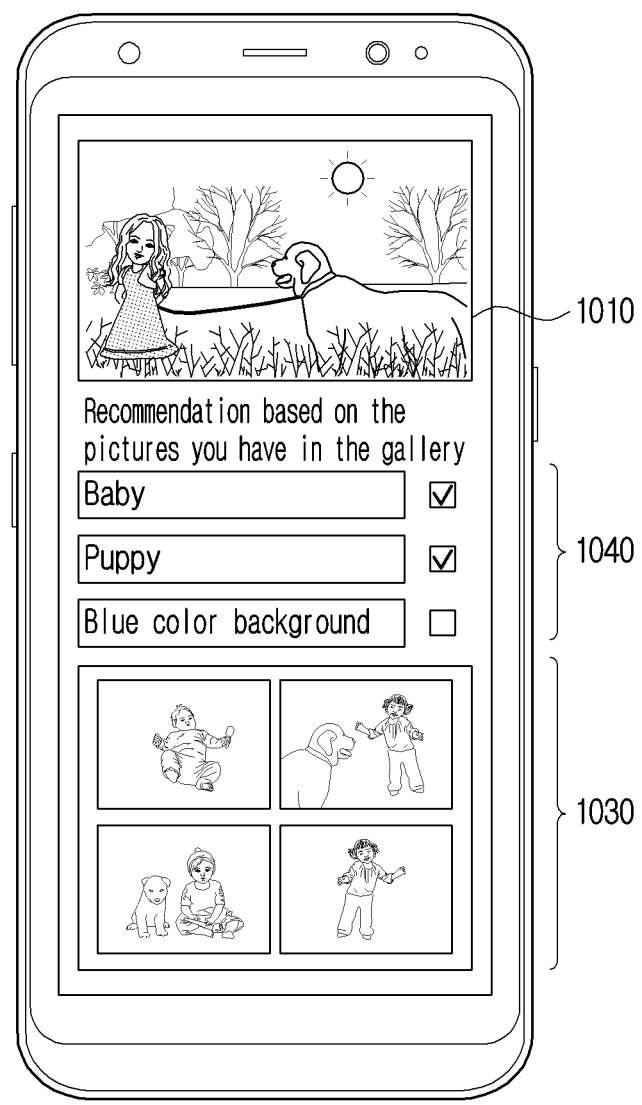

FIGS. 10A and 10B are diagrams for explaining a method for searching for a related image by using a search history or a recommended keyword according to embodiments of the disclosure.

Specifically, in order to help the related image search of a user, the electronic apparatus 100 may display a region 1020 including history information recently used (or search formula recently used) as shown in FIG. 10A, or display a region 1040 including a user recommendation information as shown in FIG. 10B. As shown in FIGS. 10A and 10B, the image display region 1010 and a searched result providing region 1030 may be displayed together.

In particular, the history information recently used may include information selected by a user a predetermined number of times or more from the information regarding the object, and the user recommendation information may include tag information having a predetermined frequency or more from the tag information of images stored in the electronic apparatus 100 or information recommended by an external server.

In addition, in order to select the history information or the user recommendation information, as shown in FIGS. 10A and 10B, checkboxes may be displayed, but this is merely an embodiment, and a list including the history information or the user recommendation information may be displayed.

Figure 11:
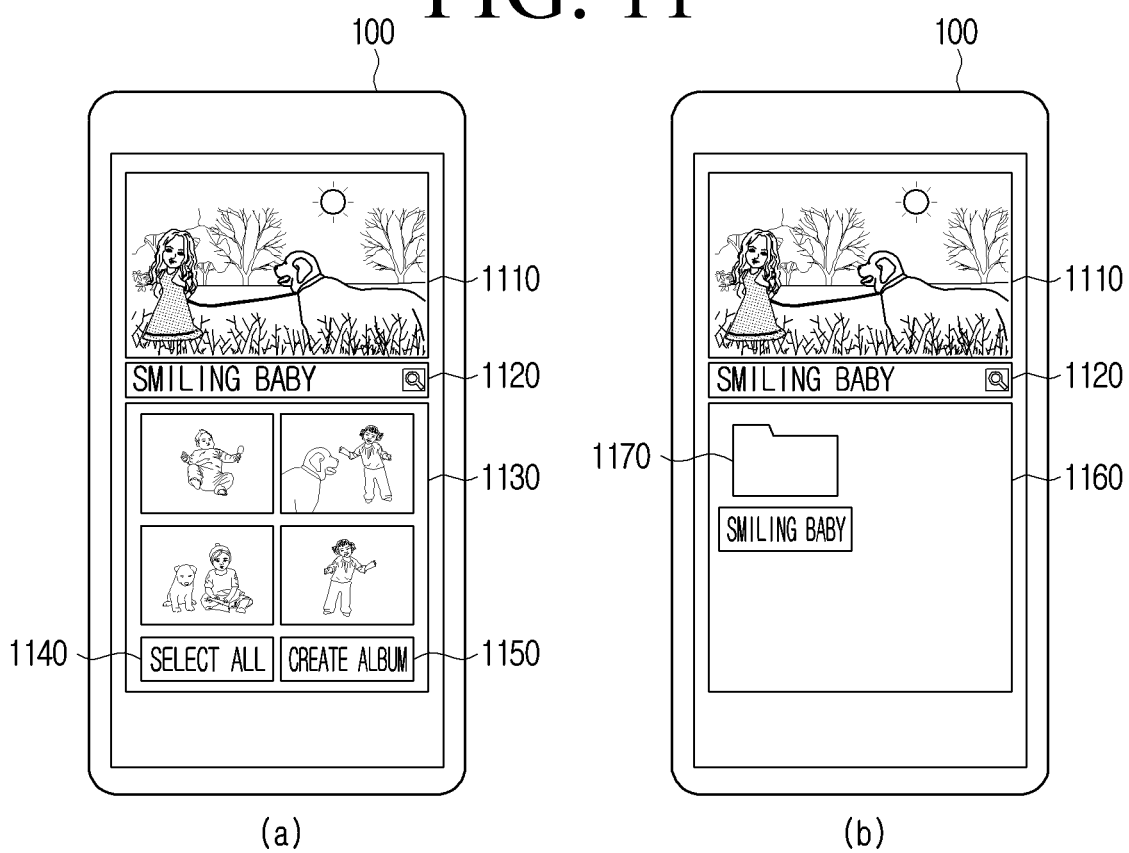
FIG. 11 is a diagram for explaining a method for generating an album by using a related image according to an embodiment.

FIG. 11 is a diagram for explaining a method for generating an album by using a related image according to an embodiment of the disclosure.

The electronic apparatus 100 may generate an album by using related images according to a user input. Specifically, as shown in (a) of FIG. 11, the electronic apparatus 100 may display an image display region 1110, a search box 1120, and a searched result providing region 1130. The electronic apparatus 100 may display an icon 1140 for selecting all of the related images and an icon 1150 for generating an album in the searched result providing region 1130.

Specifically, when at least one of the plurality of related images displayed in the searched result providing region 1130 is selected by a user input (that is, touch input), the electronic apparatus 100 may highlight the selected related images. Alternatively, when the icon 1140 for selecting all of the related images is selected, the electronic apparatus 100 may highlight all of the related images.

When the icon 1150 for generating an album is selected while at least one related image has been selected among the plurality of related images, the electronic apparatus 100 may generate an album including the selected related image. As shown in (b) of FIG. 11, the electronic apparatus 100 may display an icon 1170 representing an album which is newly generated in the searched result providing region 1130. A title of the newly generated album may be the "information regarding the object" used for searching the related image, but is not limited thereto.

Figure 12:
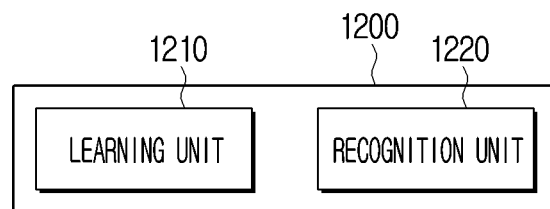
FIG. 12 is a block diagram showing a configuration of an electronic apparatus for training and using a recognition model according to an embodiment.

FIG. 12 is a block diagram showing a configuration of an electronic apparatus (particularly, processor) for training and using the recognition model according to an embodiment of the disclosure.

Referring to FIG. 12, a processor 1200 may include at least one of a learning unit 1210 and a recognition unit 1220. The processor 1200 of FIG. 12 may correspond to the processor 140 of the electronic apparatus 100 of FIGS. 2A and 2B or a processor of a data learning server (not shown).

The learning unit 1210 may generate or train a recognition model having a criteria for recognizing objects and a recognition model having criteria for predicting context information of objects. The learning unit 1210 may generate a recognition model having determination criteria by using collected learning data.

In an example, the learning unit 1210 may generate, train, or refine an object recognition model for determining criteria for predicting objects included in an image by using an image including at least one object as learning data.

In another example, the learning unit 1210 may generate, train, or refine a context recognition model for determining criteria for predicting context of objects included in an image by using an image including at least one object as learning data.

In still another example, the learning unit 1210 may generate, train, or refine a tag information recognition model for acquiring tag information by using an image including at least one object as learning data.

The recognition unit 1220 may predict a recognition target or situation included in predetermined data by using the predetermined data as input data of the trained recognition model.

In an example, the recognition unit 1220 may acquire (or predict or infer) the information regarding the object selected by a user by using the object region (or image) including the object as input data of the trained recognition model.

In another example, the recognition unit 1220 may acquire (or predict or infer) the context information of the object by applying the information regarding the object and the image to the trained recognition model.

At least a part of the learning unit 1210 and at least a part of the recognition unit 1220 may be implemented as a software module or may be produced in a form of at least one hardware chip and mounted on an electronic apparatus. For example, at least one of the learning unit 1210 and the recognition unit 1220 may be produced in a form of a dedicated hardware chip for artificial intelligence (AI) or may be produced as a part of an existing generic-purpose processor (e.g., a CPU or an application processor) or a graphic processor (e.g., GPU) and mounted on the various electronic apparatuses or object recognition devices. The dedicated hardware chip for artificial intelligence is a dedicated processor specialized in possibility calculation, and may rapidly process calculation operations in the artificial intelligence field such as machine learning due to higher parallel processing performance than that of the existing generic purpose processor. When the learning unit 1210 and the recognition unit 1220 are implemented as a software module (or a program module including instructions), the software module may be stored in non-transitory computer readable media. In this case, the software module may be provided by an operating system (OS) or a predetermined application. Alternatively, a part of the software module may be provided by an operating system (OS) and the other part thereof may be provided by a predetermined application.

In this case, the learning unit 1210 and the recognition unit 1220 may be mounted on one electronic apparatus or may be respectively mounted on separate electronic apparatuses. For example, one of the learning unit 1210 and the recognition unit 1220 may be included in the electronic apparatus 100 or the other one thereof may be included in an external device. In addition, in regards to the learning unit 1210 and the recognition unit 1220, model information constructed by the learning unit 1210 may be provided to the recognition unit 1220, or data input by the recognition unit 1220 may be provided to the learning unit 1210 as additional learning data in a wired or wireless manner.

Figure 13A:
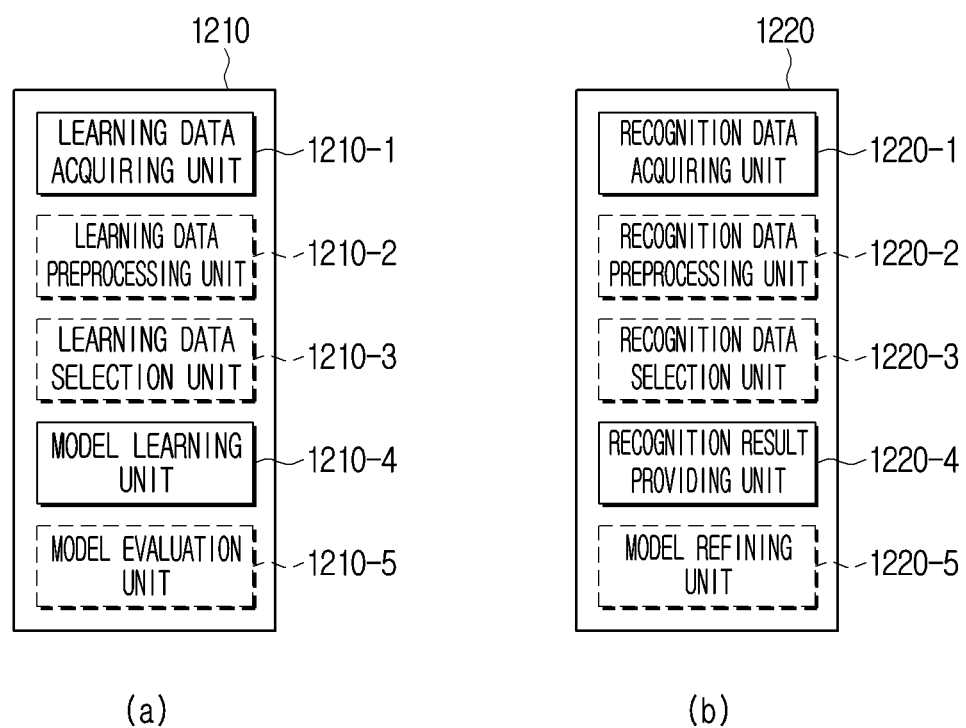
FIGS. 13A and 13B are block diagrams showing a specific configuration of a learning unit and a recognition unit according to an embodiment.

FIG. 13A is a block diagram of the learning unit 1210 and the recognition unit 1220 according to embodiments.

Referring to (a) of FIG. 13A, the learning unit 1210 according to an embodiment includes a learning data acquiring unit 1210-1 and a model learning unit 1210-4. In addition, the learning unit 1210 may further selectively include at least one of a learning data preprocessing unit 1210-2, a learning data selection unit 1210-3, and a model evaluation unit 1210-5.

The learning data acquiring unit 1210-1 may acquire learning data necessary for the recognition model for predicting a recognition target. According to an embodiment of the disclosure, the learning data acquiring unit 1210-1 may acquire at least one of the entire image including the object, an image corresponding to the object region, the object information, and the context information of the object as learning data. The learning data may be data collected or tested by the learning unit 1210 or a manufacturer of the learning unit 1210.

The model learning unit 1210-4 may train the recognition model to have determination criteria regarding how to determine a predetermined recognition target by using the learning data. In an example, the model learning unit 1210-4 may construct a recognition model by extracting features of the entire input image or an image corresponding to the object region, projecting the features in a vector space, and indexing information or the context information of the object in each vector.

Particularly, the model learning unit 1210-4 may train the recognition model through supervised learning using at least a part of the learning data as determination criteria. Alternatively, the model learning unit 1210-4 may train the recognition model through unsupervised learning of finding determination criteria for determination of situation by, for example, self-training by using the learning data without particular supervision. In addition, the model learning unit 1210-4 may train the recognition model through, for example, reinforcement learning using a feedback regarding whether or not a result of the situation determination according to the learning is accurate. Further, the model learning unit 1210-4 may train the recognition model, for example, by using a learning algorithm including error back-propagation or gradient descent.

Furthermore, the model learning unit 1210-4 may train selection criteria regarding which learning data is to be used for predicting a recognition target by using the input data.

When a plurality of recognition models constructed in advance exist, the model learning unit 1210-4 may determine a recognition model with basic learning data that is most relevant to the input learning data, as a recognition model to be trained. In this case, the basic learning data pieces may be classified in advance for each type of data and the recognition models may be constructed in advance for each type of data. For example, the basic learning data pieces may be classified in advance based on various criteria such as a region where the learning data is generated, time when the learning data is generated, a size of the learning data, a genre of the learning data, a creator of the learning data, a type of an object in the learning data, and the like.

When the recognition model is trained, the model learning unit 1210-4 may store the trained recognition model. In this case, the model learning unit 1210-4 may store the trained recognition model in the memory 130 of the electronic apparatus 100. Alternatively, the model learning unit 1210-4 may store the trained recognition model in a memory of a server connected to the electronic apparatus 100 in a wired manner or via a wireless network.

The learning unit 1210 may further include the learning data preprocessing unit 1210-2 and the learning data selection unit 1210-3, in order to improve an analysis result of the recognition model or save resources or time necessary for generating the recognition models.

The learning data preprocessing unit 1210-2 may preprocess the acquired data so that the acquired data may be used in the training for the situation determination. The learning data preprocessing unit 1210-2 may process the acquired data in a predetermined format so that the model learning unit 1210-4 may use the acquired data for the training for the situation determination.

The learning data selection unit 1210-3 may select data necessary for the training from the data acquired by the learning data acquiring unit 1210-1 or the data preprocessed by the learning data preprocessing unit 1210-2. The selected learning data may be provided to the model learning unit 1210-4. The learning data selection unit 1210-3 may select learning data necessary for the training from the acquired or preprocessed data according to predetermined selection criteria. In addition, the learning data selection unit 1210-3 may select the learning data according to selection criteria predetermined by the training of the model learning unit 1210-4.

The learning unit 1210 may further include the model evaluation unit 1210-5 in order to improve an analysis result of the recognition model.

The model evaluation unit 1210-5 may input evaluation data to the recognition model, and causes the model learning unit 1210-4 to perform the training again, when an analysis result output from the evaluation data does not satisfy predetermined criteria. In this case, the evaluation data may be data predefined for evaluating recognition models.

For example, when a number or a rate of the evaluation data pieces having inaccurate analysis results, among analysis results of the trained recognition model regarding the evaluation data, exceeds a predetermined threshold value, the model evaluation unit 1210-5 may evaluate that predetermined criteria are not satisfied.

Meanwhile, the number of trained recognition models is more than one, the model evaluation unit 1210-5 may evaluate whether or not each of the trained recognition model satisfies predetermined criteria, and determine a model satisfying the predetermined criteria as a final recognition model. In this case, when a number of models satisfying the predetermined criteria is more than one, the model evaluation unit 1210-5 may determine any one or a predetermined number of models set in advance in the order of high evaluation grades as a final recognition model.

Referring to (b) of FIG. 13A, the recognition unit 1220 according to an embodiment may include a recognition data acquiring unit 1220-1 and a recognition result providing unit 1220-4. In addition, the recognition unit 1220 may further selectively include at least one of a recognition data preprocessing unit 1220-2, a recognition data selection unit 1220-3, and a model refining unit 1220-5.

The recognition data acquiring unit 1220-1 may acquire data necessary for the situation determination or the object recognition. The recognition result providing unit 1220-4 may determine a situation by applying the data acquired by the recognition data acquiring unit 1220-1 to the trained recognition model as an input value. The recognition result providing unit 1220-4 may provide an analysis result according to an analysis purpose of the data. The recognition result providing unit 1220-4 may acquire an analysis result by applying data selected by the recognition data preprocessing unit 1220-2 or the recognition data selection unit 1220-3 which will be described later to the recognition model as an input value. The analysis result may be determined by the recognition model.

In an example, the recognition result providing unit 1220-4 may acquire (or predict) recognition information regarding the object by applying an image including the object (for example, entire image or image corresponding to the object region) acquired by the recognition data acquiring unit 1220-1 to the trained recognition model.

In another example, the recognition result providing unit 1220-4 may acquire (or predict) context information of the object by applying at least one of image data acquired by the recognition data acquiring unit 1220-1 and information regarding the object to the trained recognition model.

The recognition unit 1220 may further include the recognition data preprocessing unit 1220-2 and the recognition data selection unit 1220-3, in order to improve an analysis result of the recognition model or save resources or time necessary for providing the analysis result.

The recognition data preprocessing unit 1220-2 may preprocess the acquired data so that the acquired data may be used for the situation determination. The recognition data preprocessing unit 1220-2 may process the acquired data in a predefined format so that the analysis result providing unit 1220-4 may use the acquired data for the situation determination.

The recognition data selection unit 1220-3 may select data necessary for the situation determination from the data acquired by the recognition data acquiring unit 1220-1 or the data preprocessed by the recognition data preprocessing unit 1220-2. The selected data may be provided to the analysis result providing unit 1220-4. The recognition data selection unit 1220-3 may select a part or all of acquired or preprocessed data pieces according to predetermined selection criteria for the situation determination. In addition, the recognition data selection unit 1220-3 may select data according to selection criteria predetermined by the training performed by the model learning unit 1210-4.

The model refining unit 1220-5 may control the recognition model to be refined based on the evaluation for the analysis result provided by the recognition result providing unit 1220-4. For example, the model refining unit 1220-5 may request the model learning unit 1210-4 to additionally train or refine the recognition model by providing the analysis result provided by the recognition result providing unit 1220-4 to the model learning unit 1210-4.

Figure 13B:
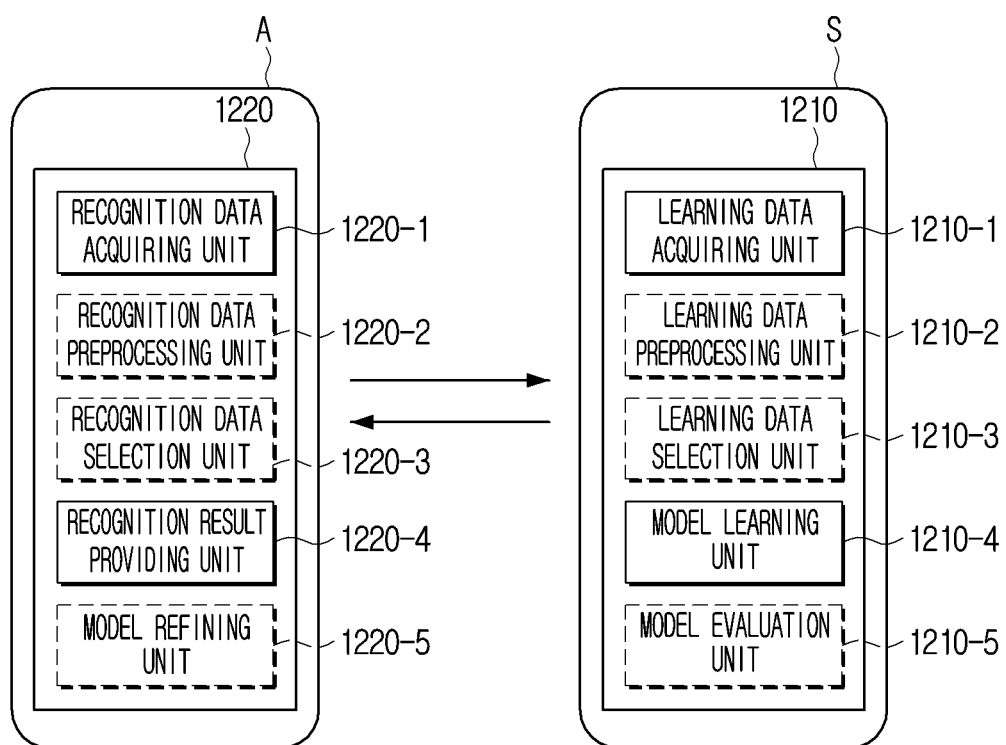

FIG. 13B is a diagram showing an example of training and recognizing data by linking the electronic apparatus 100 according to an embodiment and an external server 50 to each other.

Referring to FIG. 13B, the external server 50 may perform training for criteria for recognizing the object or the context information of the object, and the electronic apparatus 100 may determine a situation based on a learning result by the server 50.

In this case, the model learning unit 1210-4 of the server 50 may execute the function of the learning unit 1210 shown in FIG. 12. The model learning unit 1210-4 of the server 50 may perform training for criteria regarding which image or object image is to be used for determining a predetermined situation and how the object or the context information of the object is to be determined by using the data described above.

In addition, the recognition result providing unit 1220-4 of the electronic apparatus 100 may determine information regarding the object (that is, recognition information of the object and the context information of the object) by applying data selected by the recognition data selection unit 1220-3 to a recognition model generated by the server 50. Alternatively, the recognition result providing unit 1220-4 of the electronic apparatus 100 may receive a recognition model generated by the server 50 from the server 50 and recognize the object or recognize the context of the object by using the received recognition model. In this case, the recognition result providing unit 1220-4 of the electronic apparatus 100 may acquire information regarding the object included in the image by applying an image selected by the recognition data selection unit 1220-3 to the recognition model received from the server 50.

Figure 14:
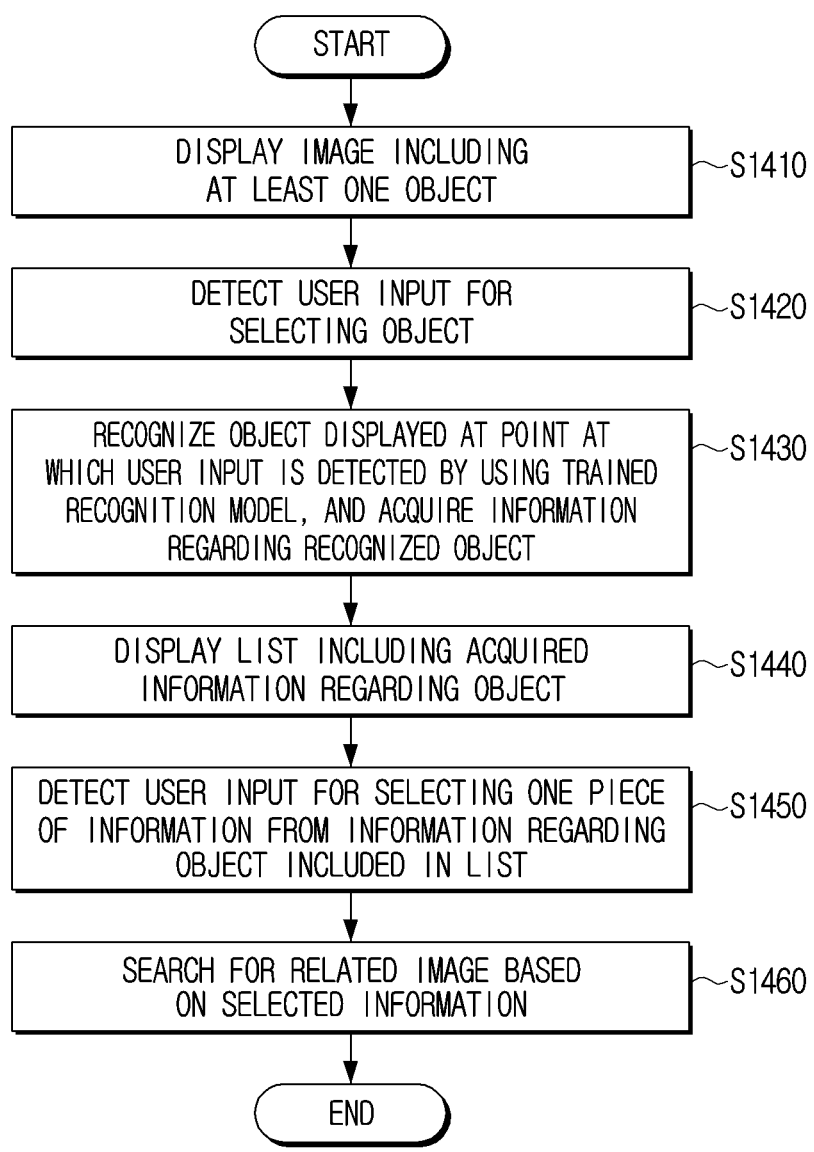
FIG. 14 is a flowchart for explaining a method for searching for an image related to an object selected by a user according to an embodiment.

FIG. 14 is a flowchart for explaining a method for searching for an image related to an object selected by a user according to an embodiment of the disclosure.

First, the electronic apparatus 100 may display an image including at least one object (S1410). The image may be a picture provided while a gallery application is executed, but is not limited thereto, and may be a web image provided while a web application is executed.

The electronic apparatus 100 may detect a user input for selecting the object (S1420). The user input may be a long press touch that is to tap and hold a point of a region, where the object is displayed, down for a certain period of time or longer, force touch that is to tap a point of a region, where the object is displayed, with predetermined pressure or more, multi-touch that is to tap a point of a region, where the object is displayed, multiple times within a predetermined period of time, or a drawing touch that is to draw on a region where the object is displayed, but is not limited thereto.

The electronic apparatus 100 may recognize an object displayed at a point at which the user input is detected by using the trained recognition model, and acquire information regarding the recognized object (S1430). The electronic apparatus 100 may identify an object region based on information regarding a point at which the user input is detected (for example, coordinate value), and recognize an object by inputting the object region to the object recognition model as input data. The electronic apparatus 100 may acquire recognition information of the object (for example, a type of the object, a color of the object, a size of the object, a name of the object, or a gender of the object). In addition, the electronic apparatus 100 may recognize the context information of the object by inputting the image and the information regarding the object to the context recognition model as input data. The electronic apparatus 100 may detect face expression, an emotion, clothes, movement of the object, a relationship with other objects, and the like as the context information of the object.

The electronic apparatus 100 may display a list including the acquired information regarding the object (S1440). The list may be displayed in the vicinity of the selected object.

The electronic apparatus 100 may detect a user input for selecting one piece of information from the information regarding the object included in the list (S1450).

The electronic apparatus 100 may search for a related image based on the selected information (S1460). Specifically, the electronic apparatus 100 may search for an image having tag information identical or related to the selected information among the plurality of images stored in the electronic apparatus 100, and search for an image by generating and transmitting a query including the selected information to an external search server.

According to an embodiment of the disclosure described above, a user may search for an image similar to an image that the user is currently looking at, more conveniently and specifically.

Figure 15:
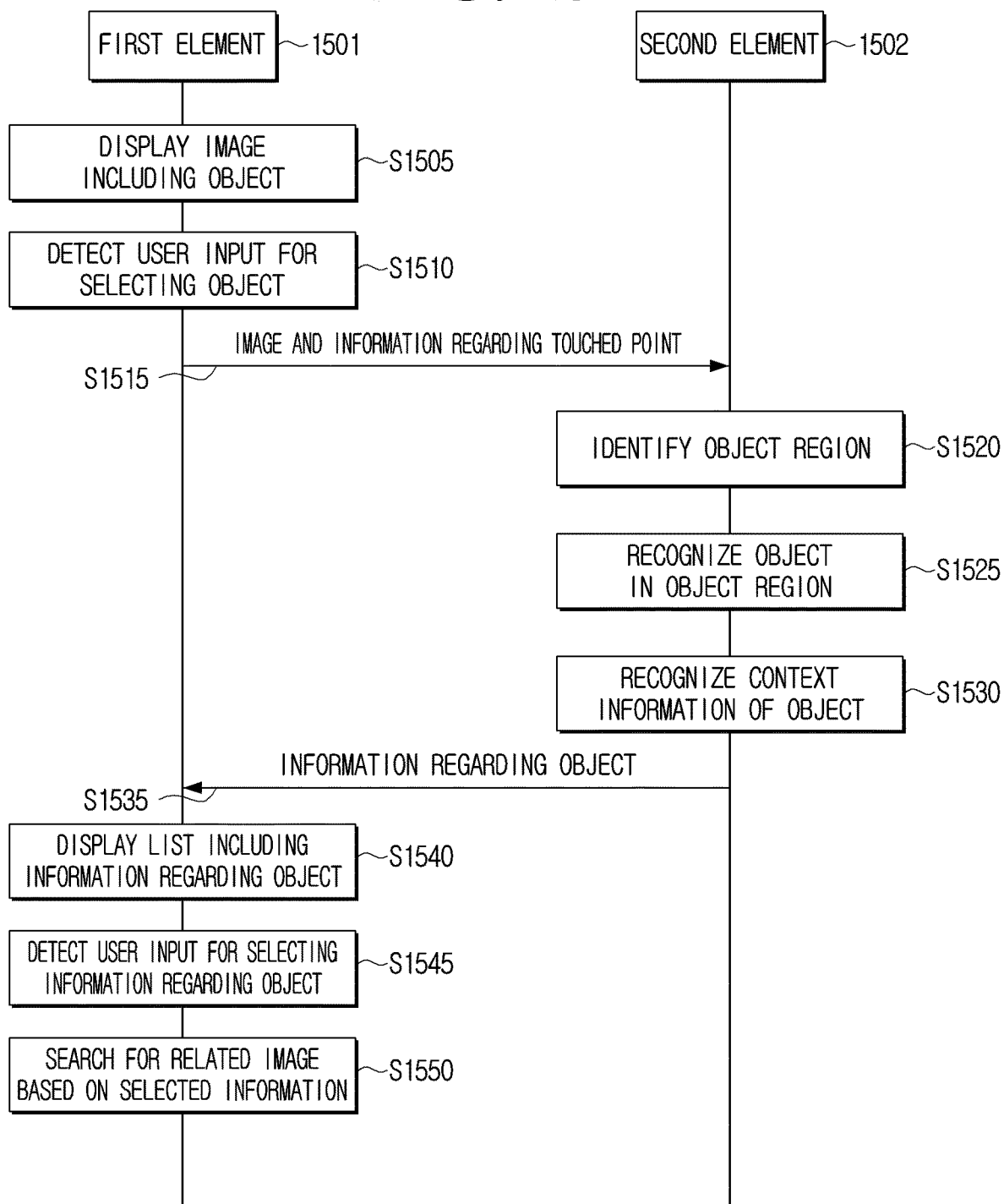
FIGS. 15, 16, and 17 are flowcharts of a network system using the recognition model according to embodiments.
Figure 16:
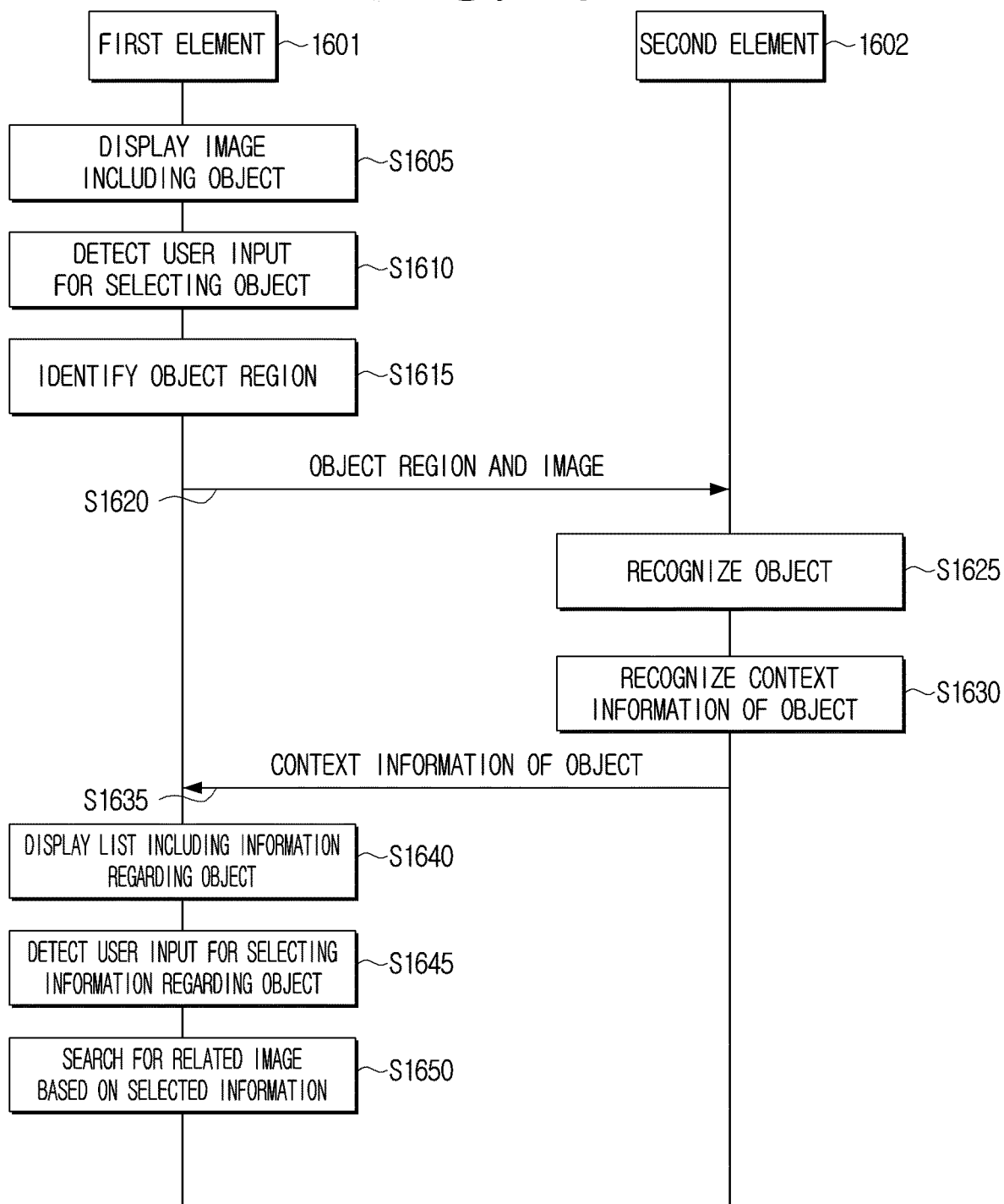
Figure 17:
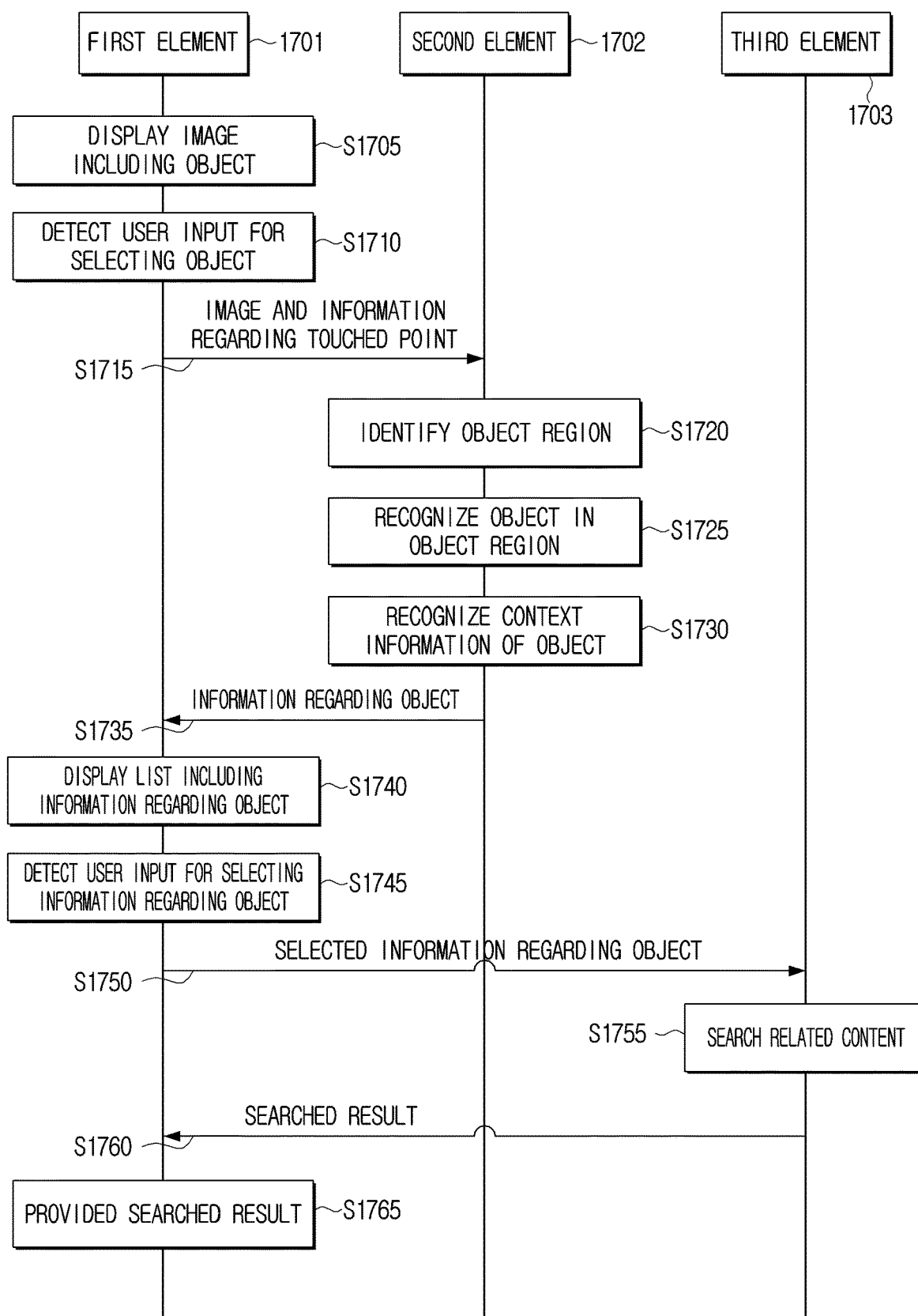

FIGS. 15 to 17 are flowcharts of a network system using the recognition model according to embodiments of the disclosure.

In FIGS. 15 to 17, a network system using the recognition model may include at least two of a first element 1501, 1601, or 1701, a second element 1502, 1602, or 1702, and a third element 1703.

The first element 1501, 1601, or 1701 may be the electronic apparatus 100 and the second element 1502, 1602, or 1702 may be a server in which the recognition model is stored. Alternatively, the first element 1501, 1601, or 1701 may be a generic-purpose processor and the second element 1502, 1602, or 1702 may be an artificial intelligence-dedicated processor. Alternatively, the first element 1501, 1601, or 1701 may be at least one application and the second element 1502, 1602, or 1702 may be an operating system (OS). That is, the second element 1502, 1602, or 1702 is an element that is more integrated or more exclusive or has a less delay, more improved performance, or more resources, compared to the first element 1501, 1601, or 1701, and may be an element that may more rapidly and effectively process various calculations required when generating, refining, and applying a data recognition model, compared to the first element 1501, 1601, or 1701.

In this case, an interface for transmitting/receiving data between the first element 1501, 1601, or 1701 and the second element 1502, 1602, or 1702 may be defined.

For example, an application program interface (API) having learning data to be applied to the recognition model as a factor value (or medium value or delivery value) may be defined. The API may be defined with a set of subroutines or functions that may be invoked from a certain protocol (for example, protocol defined in an electronic apparatus A) for a certain process of another protocol (for example, protocol defined in a server). That is, an environment where the operation of a certain protocol is executed in another protocol may be provided with the API.

The third element 1703 may acquire a searched result including a related image related to the object based on data received from at least one of the first element 1501, 1601, or 1701 and the second element 1502, 1602, or 1702. The third element 1703 may correspond to, for example, the content search device 20 of FIG. 5. The data received by the third element 1703 may be, for example, information regarding the object selected by a user.

In an example, in FIG. 15, first, the first element 1501 may display an image including an object (S1505).

While the image including the object is displayed, the first element 1501 may detect a user input for selecting the object (S1510).

In response to the user input, the first element 1501 may transmit the image and information regarding a touched point (for example, a touch coordinate value) to the second element 1502 (S1515).

The second element 1502 may identify an object region in which the object selected by a user is displayed, based on the received image and information regarding a touched point (S1520).

The second element 1502 may recognize the object in the object region by inputting the identified object region to an object recognition model (S1525). The second element 1503 may acquire object recognition information regarding a type of the object, a color of the object, a size of the object, a name of the object, a gender of the object, and the like, as the information regarding the object.

The second element 1502 may recognize context information of the object by inputting the image and the information regarding the object to a context recognition model (S1530). The second element 1503 may acquire context information of the object regarding a face expression of the object, an emotion of the object, clothes of the object, a movement of the object, a relationship between the object and another object, and the like as the information regarding the object.

The second element 1502 may transmit the information regarding the object to the first element 1501 (S1535).

The first element 1501 may display a list including the information regarding the object (S1540). The first element 1501 may display a list in the vicinity of the object for which the user input is detected.

The first element 1501 may detect the user input for selecting the information regarding the object (S1545) and the first element 1501 may search for a related image based on the selected information (S1550).

In another example, in FIG. 16, the first element 1601 may detect a user input for selecting an object from an image including objects (S1605 and S1610). The operations corresponding thereto correspond to the operation S1505 to the operation S1510 of FIG. 15, and therefore the overlapped description will be omitted.

The first element 1601 may identify an object region in which an object selected by a user is displayed, based on the received image for which the user input is detected and information regarding a touched point (S1615).

The first element 1601 may transmit the identified object region and the image to the second element 1602 (S1620).

The following operations S1625 to S1650 correspond to the operations S1525 and s1550 of FIG. 15, and therefore the overlapped description will be omitted.

In another example, in FIG. 17, the first element 1701 may display a list including information regarding an object selected by a user and detect a user input for selecting one piece of information from the information regarding the object by being linked to the second element 1702 (S1705 to S1745). The operations corresponding thereto correspond to the operation S1505 to the operation S1545 of FIG. 15, and therefore the overlapped description will be omitted.

The first element 1701 may transmit the information selected by a user to the third element 1703 (S1750). The first element 1701 may generate a query including the information selected by a user and transmit the query to the third element 1703.

The third element 1703 may search for a related content based on the information selected by a user (S1755). The third element 1703 may search for a content having a title or text identical or related to the information selected by a user, from contents stored therein or in an element connected to the third element 1703. At this time, the third element 1703 may search for only an image content among the contents, but this is merely an embodiment, and the contents may include various contents such as a video content, an audio content, and a web content.

The third element 1703 may transmit a searched result to the first element 1701 (S1760) and the first element 1701 may provide the received searched result (S1765).

Various embodiments of the disclosure may be implemented as software including instructions stored in machine (e.g., computer)-readable storage media. The machine is an apparatus which invokes instructions stored in the storage medium and is operated according to the invoked instructions, and may include an electronic apparatus (e.g., electronic apparatus 100) according to the disclosed embodiments. In a case where the instruction is executed by a processor, the processor may execute a function corresponding to the instruction directly or using other elements under the control of the processor. The instruction may include a code generated by a compiler or executed by an interpreter. The machine-readable storage medium may be provided in a form of a non-transitory storage medium. Here, the term "non-transitory" merely mean that the storage medium is tangible while not including signals, and it does not distinguish that data is semi-permanently or temporarily stored in the storage medium.

According to an embodiment, the methods according to various embodiments disclosed in this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may be composed of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. A control method of an electronic apparatus for searching for an image, the method comprising:
displaying an image;
detecting a user input for the image;
obtaining recognition information of an object displayed at a location of the image corresponding to the user input using an object recognition model;
obtaining context information of the object using a context recognition model;
displaying a list based on the recognition information and the context information, the list including one or more selection items each including text for identifying both a type of object based on the recognition information and a context of the object based on the context information;
based on a selection of one of the selection items included in the list, searching for an image related to the image based on the recognition information and the context information of the selected item; and
providing the related image.

2. The method according to claim 1, wherein the acquiring comprises:
identifying an object region based on a coordinate value of a location at which the user input is detected; and
recognizing the object by inputting the identified object region to the object recognition model.

3. The method according to claim 1, wherein the recognition information comprises at least one of a type of the object, a color of the object, a size of the object, a name of the object, or a gender of the object, and the context information comprises one or more of a movement of the object, an emotion of the object, or clothes of the object.

4. The method according to claim 1, wherein the electronic apparatus stores a plurality of images and tag information matched to the plurality of images, and
the searching comprises searching for images having tag information corresponding to the recognition information and the context information from among the plurality of images stored in the electronic apparatus.

5. The method according to claim 4, further comprising:
based on receiving a user command for generating an album by selecting at least one of the related images, generating an album including at least one related image.

6. The method according to claim 4, further comprising:
obtaining an image;
obtaining information regarding an object included in the obtained image by inputting the acquired image to a recognition model trained to predict object information; and
storing the obtained information regarding the object as tag information to be matched with the acquired image.

7. The method according to claim 1, wherein the providing comprises:
generating a query including the recognition information and the context information;
transmitting the query to an external search server;
receiving a search result including a related image corresponding to the recognition information and the context information from the search server based on the query; and
providing the search result.

8. The method according to claim 1, wherein the searching comprises:
generating a search formula based on information from first and second different objects in the image; and
searching for a related image using the search formula.

9. The method according to claim 1, wherein the list is displayed in a vicinity of the object.

10. An electronic apparatus comprising:
a display;
a user input;
a processor electrically connected to the display and the user input; and
a memory electrically connected to the processor,
wherein the processor is configured to:
detect in an input from the user input for an image displayed on the display,
obtain recognition information of an object displayed at a location of the image corresponding to the user input using an object recognition model,
obtain context information of the object using a context recognition model;
control the display to display a list based on the recognition information and the context information, the list including one or more selection items each including text for identifying both a type of object based on the recognition information and a context of the object based on the context information, and
based on a selection of one of the selection items included in the list via the user input, search for an image related to the image based on the recognition information and the context information of the selected item, and
provide the related image.

11. The apparatus according to claim 10, wherein the processor is configured to;
identify an object region based on a coordinate value of a location at which the user input is detected, and
recognize the object by inputting the identified object region to the object recognition model.

12. The apparatus according to claim 10, wherein the recognition information comprises at least one of a type of the object, a color of the object, a size of the object, a name of the object, or a gender of the object, and the context information comprises one or more of a movement of the object, an emotion of the object, or clothes of the object.

13. The apparatus according to claim 10, wherein the memory stores a plurality of images and tag information matched to the plurality of images, and
wherein the processor is configured to:
search for images having tag information corresponding to the recognition information and the context information from among the plurality of images stored in the electronic apparatus.

* * * * *